(12) United States Patent
Oliynyk et al.

(10) Patent No.: US 12,039,498 B2
(45) Date of Patent: **\*Jul. 16, 2024**

(54) TALENT PLATFORM EXCHANGE AND RATING SYSTEM

(71) Applicant: Scout Exchange LLC, Boston, MA (US)

(72) Inventors: Igor M. Oliynyk, Somerville, MA (US); Robert McDonald, Boston, MA (US); Kenneth Lazarus, Concord, MA (US); Robert Green, Boston, MA (US); Johan Bilien, Belmont, MA (US)

(73) Assignee: Scout Exchange LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,044

(22) Filed: Aug. 8, 2022

(65) Prior Publication Data

US 2023/0021978 A1 Jan. 26, 2023

Related U.S. Application Data

(62) Division of application No. 16/586,797, filed on Sep. 27, 2019, now Pat. No. 11,410,131.

(Continued)

(51) Int. Cl.
*G06Q 10/00* (2023.01)
*G06F 16/25* (2019.01)
(Continued)

(52) U.S. Cl.
CPC ....... *G06Q 10/1053* (2013.01); *G06F 16/252* (2019.01); *G06N 7/01* (2023.01); *G06Q 10/063114* (2013.01)

(58) Field of Classification Search
CPC .......... G06Q 10/1053; G06Q 10/063114
See application file for complete search history.

(56) References Cited

U.S. PATENT DOCUMENTS

| 7,509,672 B1 | 3/2009 | Horwitz et al. |
| 7,783,541 B1 | 8/2010 | Rolf |
| (Continued) | | |

FOREIGN PATENT DOCUMENTS

| CA | 2 657 495 A1 | 9/2009 |
| CN | 101512594 A | 8/2009 |
| (Continued) | | |

OTHER PUBLICATIONS

Canadian Office Action dated Jun. 20, 2023, in connection with Canadian Application No. 3,126,535.

(Continued)

*Primary Examiner* — Gabrielle A McCormick
(74) *Attorney, Agent, or Firm* — Wolf, Greenfield & Sacks, P.C.

(57) ABSTRACT

According to various aspects, systems and methods are provided for tracking actions performed in various disparate talent platforms, and generating ratings for parties that use the talent platforms based on the tracked actions. Some embodiments provide objective ratings of hiring and staffing parties that are automatically determined based on stored data records of tracked actions. The hiring and staffing party ratings may build transparency of activity performed by the parties within the disparate talent platforms. This in turn builds trust among users of the online system.

17 Claims, 15 Drawing Sheets

Related U.S. Application Data

(60) Provisional application No. 62/738,994, filed on Sep. 28, 2018.

(51) Int. Cl.
*G06N 7/01* (2023.01)
*G06Q 10/0631* (2023.01)
*G06Q 10/1053* (2023.01)

(56) References Cited

U.S. PATENT DOCUMENTS

| | | |
|---|---|---|
| 8,103,679 B1 | 1/2012 | Cranfill et al. |
| 9,405,799 B1 | 8/2016 | Kapoor et al. |
| 10,147,072 B2 | 12/2018 | Chuang et al. |
| 10,664,775 B2 | 5/2020 | Chuang et al. |
| 11,321,645 B2 | 5/2022 | Chuang et al. |
| 11,410,131 B2 | 8/2022 | Chuang et al. |
| 2002/0010614 A1 | 1/2002 | Arrowood |
| 2003/0037032 A1 | 2/2003 | Neece et al. |
| 2004/0230452 A1 | 11/2004 | Abe et al. |
| 2004/0267595 A1 | 12/2004 | Woodings et al. |
| 2005/0267793 A1 | 12/2005 | Campbell et al. |
| 2007/0021982 A1 | 1/2007 | Sun |
| 2007/0033064 A1 | 2/2007 | Abrahamsohn |
| 2007/0094109 A1 | 4/2007 | Perry |
| 2007/0288308 A1 | 12/2007 | Chen et al. |
| 2008/0027783 A1 | 1/2008 | Hughes et al. |
| 2008/0059523 A1 | 3/2008 | Schmidt et al. |
| 2008/0065441 A1 | 3/2008 | Langmack et al. |
| 2008/0140430 A1* | 6/2008 | Hyder .......... G06Q 30/00 707/999.005 |
| 2009/0083235 A1 | 3/2009 | Joao |
| 2009/0089124 A1 | 4/2009 | Henderson et al. |
| 2009/0094239 A1* | 4/2009 | Sabol .......... G06Q 10/10 |
| 2009/0125353 A1 | 5/2009 | Bullock et al. |
| 2009/0125443 A1* | 5/2009 | Lappin .......... G06Q 10/1053 705/39 |
| 2009/0177518 A1 | 7/2009 | Adams et al. |
| 2009/0216680 A1 | 8/2009 | McCown et al. |
| 2009/0287514 A1 | 11/2009 | West |
| 2009/0299829 A1 | 12/2009 | Fraser et al. |
| 2010/0030595 A1 | 2/2010 | Day |
| 2010/0169143 A1 | 7/2010 | Carr et al. |
| 2010/0185551 A1 | 7/2010 | Ganesh et al. |
| 2010/0211516 A1 | 8/2010 | Andrekovich et al. |
| 2011/0137816 A1 | 6/2011 | Kornblum et al. |
| 2011/0208664 A1 | 8/2011 | Rahman |
| 2011/0276506 A1 | 11/2011 | Schmitt |
| 2011/0276631 A1 | 11/2011 | Schmitt |
| 2012/0089432 A1 | 4/2012 | Podgurny et al. |
| 2012/0109837 A1 | 5/2012 | Sahagun et al. |
| 2012/0185402 A1 | 7/2012 | Lajoie |
| 2012/0215578 A1 | 8/2012 | Swierz, III et al. |
| 2012/0239585 A1 | 9/2012 | Bailey |
| 2013/0013443 A1 | 1/2013 | Christie |
| 2013/0036065 A1* | 2/2013 | Chen .......... G06Q 10/063112 705/321 |
| 2013/0036066 A1 | 2/2013 | Telahun |
| 2013/0046704 A1 | 2/2013 | Patwa et al. |
| 2013/0166465 A1 | 6/2013 | Barros et al. |
| 2013/0262175 A1 | 10/2013 | Deshpande et al. |
| 2013/0275193 A1 | 10/2013 | Chuang |
| 2013/0275321 A1 | 10/2013 | Chuang |
| 2013/0275322 A1 | 10/2013 | Chuang |
| 2013/0275323 A1* | 10/2013 | Chuang .......... G06Q 10/1053 705/321 |
| 2013/0282605 A1 | 10/2013 | Noelting |
| 2014/0188768 A1 | 7/2014 | Bonissone et al. |
| 2014/0207698 A1 | 7/2014 | Geisse et al. |
| 2014/0244333 A1 | 8/2014 | Bournas |
| 2014/0337242 A1 | 11/2014 | Bailey et al. |
| 2014/0358810 A1 | 12/2014 | Hardtke et al. |
| 2015/0112765 A1 | 4/2015 | Sundaresh et al. |
| 2015/0242781 A1 | 8/2015 | Mancuso et al. |
| 2015/0317602 A1 | 11/2015 | Rao et al. |
| 2016/0027991 A1 | 1/2016 | Suzuki |
| 2016/0140528 A1 | 5/2016 | Shaaban et al. |
| 2016/0300190 A1 | 10/2016 | Moran |
| 2017/0024410 A1 | 1/2017 | Pola |
| 2017/0069036 A1 | 3/2017 | Shaaban et al. |
| 2017/0109834 A1 | 4/2017 | Shaaban et al. |
| 2017/0243152 A1 | 8/2017 | Thomson et al. |
| 2017/0357943 A1 | 12/2017 | Tiner et al. |
| 2017/0357945 A1 | 12/2017 | Ashkenazi et al. |
| 2018/0232683 A1 | 8/2018 | Chuang et al. |
| 2018/0232684 A1 | 8/2018 | Chuang et al. |
| 2018/0232703 A1 | 8/2018 | Chuang et al. |
| 2019/0220748 A1 | 7/2019 | Denil et al. |
| 2019/0244176 A1 | 8/2019 | Chuang et al. |
| 2020/0104800 A1 | 4/2020 | Oliynyk et al. |
| 2020/0226532 A1 | 7/2020 | Lazarus et al. |
| 2021/0103875 A1 | 4/2021 | Chuang et al. |
| 2022/0261734 A1 | 8/2022 | Chuang et al. |

FOREIGN PATENT DOCUMENTS

| | | | |
|---|---|---|---|
| CN | 104966179 A | 10/2015 | |
| EP | 3 163 525 A1 | 5/2017 | |
| EP | 3 734 523 A1 | 11/2020 | |
| EP | 3734523 A1 * | 11/2020 | ...... G06Q 10/063112 |
| GB | 2558032 A | 7/2018 | |
| JP | 2002-024459 A | 1/2002 | |
| JP | 2002-288325 A | 10/2002 | |
| JP | 2004-192224 A | 7/2004 | |
| JP | 2005-222168 A | 8/2005 | |
| JP | 2005-275991 A | 10/2005 | |
| JP | 2006-185409 A | 7/2006 | |
| JP | 2009-075690 A | 4/2009 | |
| JP | 2011-517354 A | 6/2011 | |
| JP | 2015-501024 A | 1/2015 | |
| KR | 100571718 B1 | 4/2006 | |
| KR | 100571718 B1 * | 4/2006 | |
| WO | WO 2001/09772 A1 | 2/2001 | |
| WO | WO 2002/46884 A2 | 6/2002 | |
| WO | WO 2006/132759 A2 | 12/2006 | |
| WO | WO 2008/121171 A1 | 10/2008 | |
| WO | WO 2009/108445 A1 | 9/2009 | |
| WO | WO 2013/052769 A1 | 4/2013 | |
| WO | WO 2018/223235 A1 | 12/2018 | |

OTHER PUBLICATIONS

European Examination Report dated Feb. 9, 2023, in connection with European Application No. 19896657.4.

Canadian Office Action dated Oct. 17, 2022, in connection with Canadian Application No. 3,126,535.

Australian Examination Report No. 2 dated Sep. 23, 2022, in connection with Australian Application No. 2018217898.

International Preliminary Report on Patentability mailed Apr. 17, 2014, in connection with International Application No. PCT/US2012/058904.

International Preliminary Report on Patentability mailed Apr. 8, 2021, in connection with International Application No. PCT/US2019/053626.

International Preliminary Report on Patentability mailed Jun. 24, 2021, in connection with International Application No. PCT/US2019/065674.

International Search Report and Written Opinion dated Feb. 8, 2013, in connection with International Application No. PCT/US2012/058904.

International Search Report and Written Opinion mailed Apr. 25, 2018, in connection with International Application No. PCT/US2018/018028.

International Search Report and Written Opinion mailed Jan. 31, 2020, in connection with International Application No. PCT/US2019/053626.

International Search Report and Written Opinion mailed Mar. 4, 2020, in connection with International Application No. PCT/US2019/065674.

(56) References Cited

OTHER PUBLICATIONS

Invitation to Pay Additional Fees mailed Dec. 3, 2019, in connection with International Application No. PCT/US2019/053626.
Invitation to Pay Additional Fees mailed Dec. 6, 2012, in connection with International Application No. PCT/US2012/058904.
European Communication dated Oct. 14, 2020, in connection with European Application No. 18707550.2.
Examination Report dated Apr. 29, 2022, in connection with Australian Application No. AU2018217898.
Extended European Search Report dated Apr. 14, 2022, in connection with European Application No. 19896657.4.
Extended European Search Report dated Jul. 9, 2020, in connection with European Application No. 20159615.2.
Extended European Search Report dated Mar. 5, 2015, in connection with European Application No. EP12838881.6.
Collins, Best practices for avoiding duplicate candidate submissions to job orders by recruiters? Jul. 2007 [retrieved Jan. 23, 2013] retrieved from the Internet <URL: http://www.linkedin.com/answers/hiring-human-resources/staffing-recruiting/HRH_SFF/62429-1275612>.
Cullens, Fishing where the fish are. National Apartment Associate, Nov. 2006.
Singh et al., Prospect: A System for Screening Candidates for Recruitment. CIKM '10. Oct. 26-30, 2010:659-668.
Summons to Attend Oral Proceedings dated Aug. 2, 2019, in connection with European Application No. EP 12838881.6.
Summons to Attend Oral Proceedings dated Aug. 9, 2019, in connection with European Application No. EP 1283881.6.
Wolf, Recruiting 101. T+D. Association for Talent Development. Apr. 2014;18.
Zwilling, 10 Questions for Selecting a Recruiter to Attract the Best Talent to Your Business Team. Sep. 11, 2011 https://www.inc.com/martin-zwilling/how-to-find-best-hire-for-that-key-role-in-your-new-venture.html. p. 1-6.
European Examination Report dated Jan. 26, 2023, in connection with European Application No. 20 159 615.2-1218.
Chinese Office Action dated Mar. 31, 2023, in connection with Chinese Application No. 201880025119.0.
Luk et al., Web-Service Based Human Resource Recruitment by Using Matchmaking Decision Support. $10^{th}$ IEEE. 2006. 8 pages.

\* cited by examiner

Job Details unintegrated 2
Finance Specialist
Tampa, FL
Permanent | Req ID: FN-082917
Job Category: Finance & Accounting ★★★★★
Your Rating for this Job Category Salary: $70,000-$75,000
Fee: 10% | Open to bid
Posted Today Job Description    Job Stats job req ID: FN-082917 scout connect    Scout Marketplace    My saved jobs [0]    My submitted jobs [5]    ☆☆☆☆☆ Skip K. ▼ | feedback | help Save job ○○○

Submit a candidate — 502

Senior Investigator in Charge of Investigating Appearances of Cars 🔊
Boston, MA
Permanent | Reg ID: number2

Fee: 23% | Open to bid
Posted 29 days ago

Your rating will improve if you submit strong candidates!

* Does the job match your specialty? ..........
* Is your candidate a strong match? ..........
* Are the job requirements reflected in the candidates resume? ..........
* Does the Hiring Company have all they need to assess your candidate? ..........

* First Name

* Last Name — 604

*Candidate Email   Why? — 602, 606

* Resume
Only pdf, doc, and docx files accepted
[Choose file]  No file chosen — 608

* Fee
[23%] — 610

Candidate Summary (Optional)
Candidate's desired salary range, availability etc.

Listing Summary

Test1 188 Test | 4990 | Permanent
Sedona, AZ
Salary: $30,000 - $70,000 | Fee 35% | Open to Bid
Guarantee Period: 90 Days

[View/Edit Listing] [Pause Submissions] — 702

Posted Today

Candidates — 701

Sharon S. — 704
Fee: 31%
Recruiter: Boros Istvan ⊕
Recruiter's Job Category Rating: ★★★☆☆  — 706
Recruiter's Overall Rating: ★★★☆☆
Scout Exchange: LLC ⒹD
Submitted 9:48AM on Aug 30, 2017

Pending
Expires in 14 days

Mihaela M.
Fee: 35%
Recruiter: Mihaela Nadasan ⊕
Recruiter's Job Category Rating: No Rating — 708
Recruiter's Overall Rating: ★★★☆☆
Scout Exchange: LLC Ⓓ
Submitted 10:17AM on Aug 30, 2017

Pending
Expires in 14 days

Mike Teevee
Fee: 34%
Recruiter: Corina Span ⊕
Recruiter's Job Category Rating: ★★★☆☆
Recruiter's Overall Rating: ★★★☆☆

Interested

| | |
|---|---|
| ThinkTalent | Salary: $50,000-$55,000 |
| Facilitator | Fee: 15% \| Open to bid |
| San Diego, CA | Posted 8 days ago |
| Permanent \| Req ID: F-091117 | |
| Recruiter's Rating: ★★★★☆ —*1402* | |
| | |
| ThinkTalent | Salary: $40,000-$60,000 |
| teP FUTURE DATA ANALYST PctFe | Fee: 10% \| Open to bid |
| Boston, Masschusetts | Start: Sep 8, 2017 |
| | Posted 11 days ago |

FIG. 14A

*1410* scout connect | Scout Marketplace | My saved jobs [0] | My submit

< Job Details

Salesperson
Dallas, TX
Permanent | Req ID: SP-090717
Recruiter's Rating ★★★★☆ —*1412*
Job Category: Sales & Business Development Job Description   Job Stats job req ID: SP-090717

FIG. 14B

TALENT PLATFORM EXCHANGE AND RATING SYSTEM

RELATED APPLICATIONS

This application is a divisional application of U.S. application Ser. No. 16/586,797, filed Sep. 27, 2019, entitled "TALENT PLATFORM EXCHANGE AND RATING SYSTEM", which claims the benefit under 35 U.S.C. § 119(e) of U.S. Provisional Application Ser. No. 62/738,994, filed Sep. 28, 2018, and entitled "TALENT PLATFORM EXCHANGE AND RATING SYSTEM". These applications are incorporated herein by reference in their entirety.

FIELD OF THE DISCLOSURE

The present disclosure relates to systems for recruiting and placing workers.

BACKGROUND

Hiring companies and search firm and/or staffing companies may utilize computer systems to manage candidates and applicants for open jobs. For example, a hiring company may utilize an applicant tracking system (ATS) to handle various recruitment activities. A staffing company may use a separate computer system (e.g., a separate ATS) to manage candidates and recruitment activities. A computer system used by a hiring firm or staffing firm may be referred to as a "talent platform."

SUMMARY OF THE DISCLOSURE

According to various aspects, systems and methods are provided for tracking actions performed by staffing and hiring parties for placement of candidates in computer systems used by the parties, and generating ratings for the parties based on the tracked actions. Some embodiments provide objective ratings of hiring and staffing parties that are automatically determined based on stored data records of tracked actions. The hiring and staffing party ratings may build transparency of activity performed by the parties within the disparate talent platforms. This in turn builds trust among users of the online system. For example, reliable ratings in a talent platform exchange system may give parties who use the platform exchange system trust in using the system. The ratings may also encourage trustworthiness and proper behavior within the system. The ratings may also provide expectations to different parties with respect to performance. For example, a staffing party may gain an intuition of how responsive a particular hiring party is based on a rating associated with the hiring party. In another example, a hiring party may gain an intuition of how likely a staffing party is to provide candidates who are well-qualified for job openings.

According to one aspect, an exchange system is provided. The system comprises a database, a first interface with a hiring talent platform associated with a hiring party, a second interface with a staffing talent platform associated with a staffing party, and at least one processor configured to receive, via the first interface, at least one job requisition from the hiring talent platform, receive, via the second interface, at least one candidate profile submission to the at least one job requisition from the staffing talent platform, track at least one action performed in the hiring talent platform with respect to the at least one candidate submission to the at least one job requisition at least in part by storing, in the database, a record of the at least one action, and determine ratings for the hiring party and the staffing party using the record of the at least one action.

According to one embodiment, at least one action includes accepting one or more of the at least one candidate submission. According to one embodiment, at least one action includes rejecting one or more of the at least one candidate submission. According to one embodiment, at least one processor is configured to store a time taken to perform the at least one action in the record of the at least one action. According to one embodiment, at least one processor is configured to calculate a score for the staffing party based on the record of the at least one action, and determine the rating for the staffing party based on the score. According to one embodiment, at least one processor is configured to normalize the score relative to an average score of a plurality of staffing parties. According to one embodiment, at least one processor is configured to generate at least one user interface within the hiring talent platform, and tracking the at least one action at least in part by detecting one or more selections within the at least one user interface. According to one embodiment, least one processor is configured to: determine at least one time taken to perform the at least one action within the hiring talent platform; and determine the rating for the hiring party based on the at least one time taken to perform the at least one action.

According to one aspect, an exchange system is provided. The system comprises a database, a first interface with a hiring talent platform associated with a hiring party, a second interface with a staffing talent platform associated with a staffing party, and at least one processor configured to receive, via the first interface, at least one job requisition from the hiring talent platform, receive, via the second interface, at least one candidate profile submission to the at least one job requisition from the staffing talent platform, and determine a match score for the job requisition and the staffing party using information from the at least one job requisition and information received from the at least one candidate profile submission from the staffing talent platform.

According to one embodiment, at least one processor is configured to use the match score to make recommendations to users. According to one embodiment, at least one processor is configured to determine the match score at least in part by using an augmented dataset. According to one embodiment, at least one processor is configured to store transaction data in the database, and determine the match score at least in part by using an augmented dataset including at least a portion of the stored transaction data. According to one embodiment, least one processor is configured to determine the match score at least in part by using an augmented dataset including additional datasets referenced in at least one of the job description and the candidate profile. According to one embodiment, at least one processor is configured to determine the match score at least in part by using an augmented dataset including candidate assessments.

According to one aspect, an exchange system is provided. The system comprises a database, a first interface with a hiring talent platform associated with a hiring party, a second interface with a staffing talent platform associated with a staffing party, and at least one processor configured to receive, via the first interface, at least one job requisition from the hiring talent platform, receive, via the second interface, at least one candidate profile submission to the at least one job requisition from the staffing talent platform, and determine a match score between the at least one job requisition and the at least one candidate profile submission using information from the at least one job requisition and information from the at least one candidate profile submission.

According to one embodiment, at least one processor is configured to use the match score to make recommendations to users. According to one embodiment, at least one processor is configured to determine the match score at least in part by using an augmented the dataset According to one embodiment, at least one processor is configured to store transaction data in the database, and determine the match score at least in part by using an augmented dataset including at least a portion of the stored transaction data. According to one embodiment, at least one processor is configured to determine the match score at least in part by using an augmented dataset including additional datasets referenced in the at least one job description and/or the at least one candidate submission. According to one embodiment, at least one processor is configured to determine the match score at least in part by using an augmented the dataset including candidate assessments.

According to another aspect, an exchange system is provided. The exchange system comprises: a database; at least one processor configured to: generate a first at least one user interface for at least one hiring party; receive, via the first at least one user interface, at least one job requisition; generate a second at least one user interface for at least one staffing party; receive, via the second at least one user interface, at least one candidate profile submission to the at least one job requisition; track at least one action performed in the first at least one user interface with respect to the at least one candidate submission to the at least one job requisition at least in part by storing, in the database, at least one record of the at least one action; and determine at least one rating for the at least one hiring party and/or at least one rating for the at least one staffing party using the at least one record of the at least one action.

According to one embodiment, the at least one action includes accepting one or more of the at least one candidate submission. According to one embodiment, the at least one action includes rejecting one or more of the at least one candidate submission. According to one embodiment, the at least one processor is configured to store a time taken to perform the at least one action in the at least one record of the at least one action. According to one embodiment, the at least one processor is configured to: calculate at least one score for the at least one staffing party based on the at least one record of the at least one action; and determine the rating for the at least one staffing party based on the at least one score. According to one embodiment, the at least one processor is configured to normalize the at least one score relative to an average score of a plurality of staffing parties.

According to one embodiment, the at least one processor is configured to: tracking the at least one action at least in part by detecting one or more selections within the first at least one first user interface. According to one embodiment, the at least one processor is configured to: determine at least one time taken to perform the at least one action within the first at least one user interface; and determine the at least one rating for the at least one hiring party based on the at least one time taken to perform the at least one action.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 5 shows an example of a user interface screen within a talent platform for submitting a candidate to a job requisition, according to an aspect of the present application.

FIG. 6 shows an example of a user interface screen within a talent platform for providing information about a candidate for a submission to a job requisition, according to an aspect of the present application.

FIG. 7 shows an example of a user interface screen in a talent platform that provides an indication of candidate submissions to a job requisition, according to an aspect of the present application.

FIG. 11 shows an example of a user interface screen in a talent platform displaying candidates submitted to a job requisition, according to an aspect of the present application.

FIG. 12 shows an example of a user interface screen in a talent platform displaying information about a candidate, according to an aspect of the present application.

FIGS. 14A-B show examples of user interface screens in a talent platform displaying a rating for a hiring party, according to an aspect of the present application.

DETAILED DESCRIPTION

Figure 1:
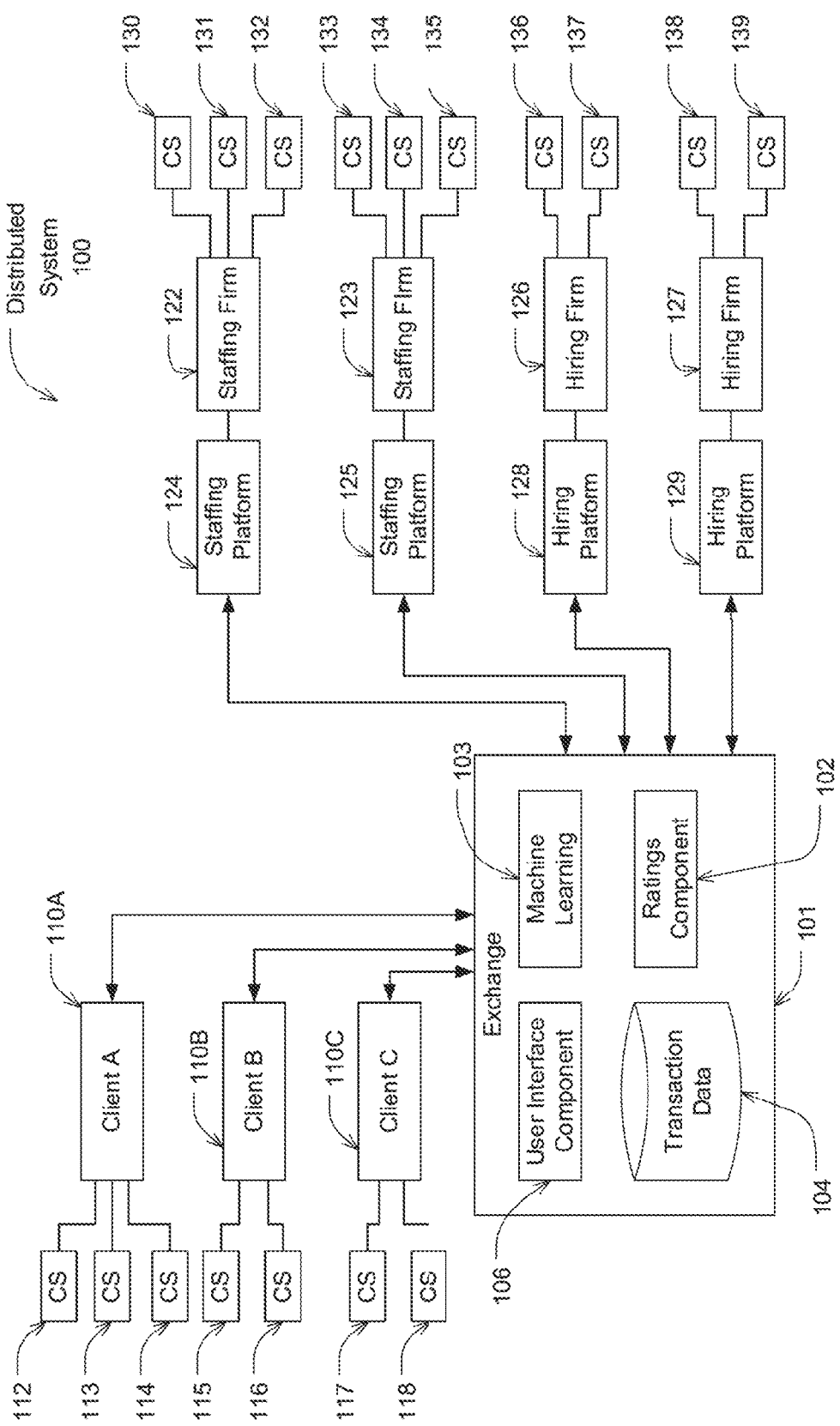
FIG. 1 shows a block diagram of a distributed computer system capable of implementing various aspects of the present application.

The inventors have recognized that disparate talent platform systems used by hiring parties (e.g., employers) and staffing parties (e.g., recruiters and/or recruiting firms) do not provide indications of performances of the hiring parties and/or staffing parties with respect to candidate placement. For example, a staffing party using a first talent platform does not have an indication of how responsive hiring parties are to candidate submissions to job requisitions in talent platforms used by the hiring parties. In another example, a hiring party using a second talent platform does not have an indication within the second talent platform of performance of staffing parties in terms of providing well-qualified candidates for job opening.

The inventors have also recognized that conventional talent platforms (e.g., ATS systems) are unable to track or aggregate a data record of various actions performed by parties within separate talent platforms. A staffing party may submit candidates to job requisitions in multiple different employer talent platforms. Conventional systems are unable to track actions by respective employers in the different employer talent platforms. For example, the disparate talent platforms are unable to track and store a record of whether each of the employers accepted or rejected a candidate within their respective talent platforms.

The inventors have developed systems and techniques for tracking actions performed by hiring and staffing parties in placing a candidate to a job requisition, and using a record of the tracked actions to determine ratings for staffing parties and hiring parties. In some embodiments, a rating for a staffing party may indicate a quality of candidates that the staffing party submits for job requisitions. For example, a higher rating may indicate that the staffing party is likely to submit candidates that meet requirements of a job requisition. A lower rating may indicate that the staffing party is unlikely to submit candidates that meet the requirements of the job requisition. In some embodiments, the rating for a hiring party may indicate a responsiveness of the hiring party. For example, a higher rating may indicate that the hiring party makes decisions with regard to a candidate submission in a shorter amount of time relative to a hiring party with a lower rating.

According to one aspect, an exchange system is provided that integrates multiple disparate talent platforms. The system may include interfaces to hiring talent platforms used by hiring parties and staffing talent platforms used by staffing parties. The system may receive job requisitions from the hiring talent platforms, and candidate submissions to the job requisitions from the staffing talent platforms. A job requisition may specify a job opening at a respective employer. The job requisition may specify information about the job such as desired qualifications, location, salary, job type, job category, and other information. The system may (1) track actions performed with respect to candidate submissions in the talent platforms, and (2) store records of the actions in a database of the system. For example, the system may track acceptances or rejections of candidates, and store data records of the acceptances or rejections in the database. In some embodiments, the system may be configured to generate user interfaces within the hiring and staffing talent platforms, and track actions by detecting actions performed within the user interfaces. The system may then use stored records of actions to determine ratings for different staffing parties and hiring parties.

FIG. 1 shows a block diagram of a distributed computer system 100 capable of implementing various aspects of the present invention. Distributed system 100 includes an exchange system 101 that integrates multiple different computer systems associated with different parties involved in candidate placement. The exchange system 101 is connected to a number of different staffing talent platforms (e.g., staffing platform 124, staffing platform 125, etc.), hiring talent platforms (e.g., hiring platform 128, hiring platform 129, etc.), and other client systems (e.g., client systems 110A-C, etc.). In some embodiments, a talent platform may comprise an applicant tracking system (ATS). For example, a talent platform may be the Taleo ATS provided by the Oracle Corporation, or the Bras sRing ATS provided by IBM. The staffing platforms 124-125 may be operated by respective staffing firms 122-123, which in turn, may authorize one or more computer systems (e.g., computer systems 130-135) to access the staffing platforms 124-125. Similarly, hiring firms 126-127 may authorize one or more computer systems 136-139 to access the hiring platforms 128-129. Client systems 110A-C may be accessed by users of computer systems 112-118. The client systems 110A-C may authorize other users to access the exchange system 101. For example, one or more prospective job candidates may access the exchange system 101 via client systems 110A-C.

The exchange system 101 includes a ratings component 102 configured to determines ratings for hiring parties and staffing parties that use the different hiring and staffing talent platforms, or that access the exchange system directly. The party may be a staffing firm, an individual recruiter, a hiring firm (e.g., an employer), and/or individuals at a hiring firm (e.g., a hiring manager). In some embodiments, the ratings component 102 may be configured to determine ratings for staffing parties (e.g., staffing firms 124-125) and hiring parties (e.g., hiring firms 126-127) that access the exchange system via respective talent platforms. The exchange system 101 includes a database 104. The database 104 stores transaction data that may be used by the ratings component 102 to determine ratings. In some embodiments, the exchange system 101 may be configured to track actions performed by hiring and staffing firm users and store a record of the actions in the database 104. In some embodiments, the exchange system 101 may be configured to track actions performed in user interfaces of the exchange system 101 provided within the various talent platforms. For example, the exchange system 101 may be configured to track candidate submissions, acceptances or rejections of candidate submissions, and/or status updates of candidates in a hiring process. In some embodiments, the exchange system 101 may be configured to track and store metadata associated with actions. For example, the exchange system 101 may be configured to store a time at which an action was performed, and/or an amount of time taken to perform an action. In some embodiments, the exchange system 101 may be configured to store information about a context associated with an action. For example, the exchange system 101 may store a job category, employer, geographic location, job type, industry, and/or salary associated with an action (e.g., acceptance or rejection of a candidate submission).

The exchange system 101 includes a machine learning component 103 that uses the transaction data and other data stored in the database 103 to generate outputs. In some embodiments, the ratings component 102 may be configured to use the machine learning component 103 to determine ratings. For example, the ratings component 102 may use one or more trained machine learning models to classify a job. The ratings component 102 may then use the job classification to determine a rating for the party for various jobs. In some embodiments, the machine learning component 102 may be configured to use ratings determined by the ratings component 102 to perform various functions. For example, the machine learning component 102 may be configured to match a staffing firm to a hiring firm based on ratings determined by the ratings component 102. In another example, the machine learning component 102 may be configured to match a candidate to a staffing firm based on ratings determined by the ratings component 102. In yet another example, the machine learning component 102 may be configured to match a candidate to a job requisition.

The exchange system 101 includes a user interface component 106 configured to generate user interfaces within user interfaces of systems that the exchange system 101 is connected to. In some embodiments, the user interface component 106 may be configured to generate one or more user interfaces within staffing talent platforms (e.g., staffing platforms 124-125) and hiring talent platforms (e.g., hiring platforms 128-129). Staffing firm users may use computer systems 130-135 to access the exchange system 101 via the user interfaces generated within the staffing talent platforms 124-125. Hiring firm users may use computer systems 136-139 to access the exchange system 101 via user interfaces generated within hiring talent platforms 128-129. Other users may use computer systems 112-118 to access the exchange system 101 from within user interfaces provided by the client systems 110A-C.

In some embodiments, the exchange system 101 may be configured to generate one or more user interfaces within the hiring platforms 128-129 that allow hiring firm users to submit job requisitions to the exchange system 101. The exchange system 101 may be configured to receive the job requisitions and store a record of the job requisitions within a data store of the exchange system 101. In some embodiments, the exchange system 101 may be configured to generate one or more user interfaces within the staffing talent platforms 124-125 that allow staffing firm users to submit candidates to the job requisitions received from the hiring talent platforms 128-129. In some embodiments, the exchange system 101 may be configured to generate user interfaces within the staffing talent platforms 124-125 that allow staffing firm users to manage candidates and submissions of candidates to job requisitions. For example, the user interface component 106 may generate one or more user interfaces via which staffing firm users may view submissions they have made to various job requisitions. In some embodiments, the exchange system 101 may be configured to generate user interfaces within hiring talent platforms 128-129 that allow hiring firm users to manage candidates and submissions of candidates to job requisitions. For example, the hiring firm users may be able to view submitted candidates to their respective job requisitions, accept candidates, reject candidates, and/or update a status of candidates in a hiring process.

In some embodiments, the user interface component 106 may be configured to generate one or more user interfaces within connected talent platforms that display one or more ratings determined by the ratings component 102. In some embodiments, the user interface component 106 may be configured to display, within a user interface generated by the exchange system 101, ratings for one or more parties that access the exchange system 101. For example, the user interface component 106 may be configured to display ratings for staffing firms 122-123. In another example, the user interface component 106 may be configured to display ratings for hiring firms 126-127. In some embodiments, the user interface component 106 may be configured to display ratings for staffing firms in a user interface generated by the user interface component 106 in hiring platforms. In some embodiments, the user interface component 106 may be configured to display ratings for hiring firms in a user interface generated by the user interface component 106 in staffing talent platforms.

In some embodiments, the exchange system 101 may include an interface to each of the computer systems with which it is connected. For example, the exchange system may include an interface with each of the staffing talent platforms 124-125, the hiring talent platforms 128-129, and the client systems 110A-C. In some embodiments, an interface with a respective computer system may comprise an application program interface (API). The API may provide an interface by which the exchange system 101 may interact with the respective computer system. The API may include software code, that when executed by the computer system, may allow the computer system to interact with the exchange system 101. For example, an API for each of staffing platforms 124-125 may include functions that allow a recruiter using the staffing platform to submit candidates to a database of candidates stored by the exchange system 101. Similarly, an API for one of hiring platforms 128-129 may include functions that allow users of the hiring platform to access information stored by the exchange system 101 (e.g., candidate records). In another example, the exchange system 101 may include an API to interact with other systems such as one of client computer systems 110A-C. The API may include software code that, when executed, allows the exchange system 101 to retrieve and/or receive data from the client computer system. Similarly, the API may include software code, that when executed, allows the exchange system 101 to transmit data to the client computer system.

In some embodiments, staffing parties and hiring parties may access the exchange system directly. In some embodiments, a hiring talent platform or hiring platform may be a user interface provided to hiring parties provided by the exchange system. In some embodiments, a staffing talent platform or staffing platform may be a user interface provided to staffing parties provided by the exchange system. The user interface component 106 may be configured to generate the user interfaces by which the hiring or staffing party users can access the exchange system 101 and perform actions in the exchange system 101. The exchange system 101 may be configured to provide a hiring interface for hiring parties and a separate staffing interface for staffing parties. User interfaces described herein may be implemented within talent platforms and outside of the talent platforms.

Figure 2:
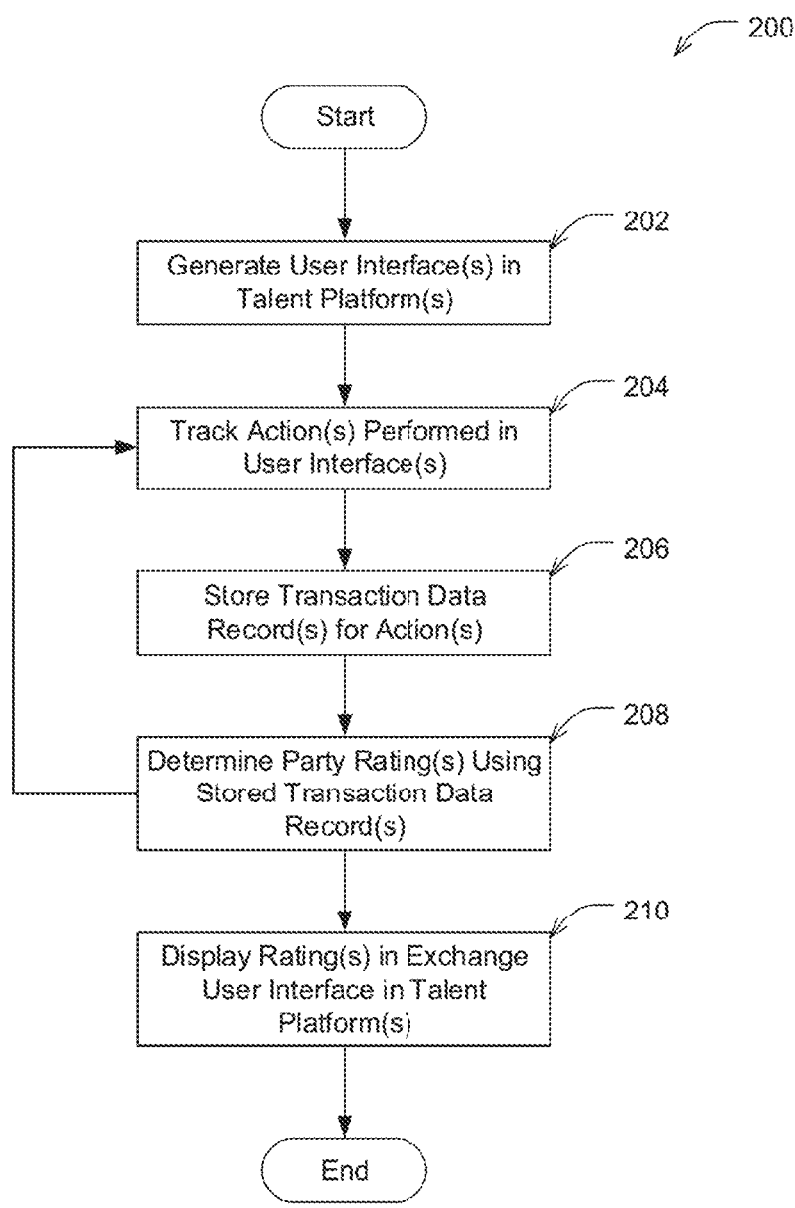
FIG. 2 shows a process for determining a rating for a party according to an aspect of the present application.

FIG. 2 shows a process 200 for determining a rating for a party according to an aspect of the present application. Process 200 may be performed by exchange system 101 described above with reference to FIG. 1.

Process 200 begins at block 202 where the exchange system generates one or more user interfaces within one or more talent platforms. In some embodiments, the system may be configured to generate a user interface within a hiring talent platform that allows a hiring party (e.g., an employer) to view candidates submitted by one or more staffing parties to one or more job requisitions associated with the hiring firm. The exchange system may receive candidate submissions from one or more staffing talent platforms used by the staffing parties. The user interface(s) may allow the hiring party to perform one or more actions with respect to a candidate submission. For example, the hiring party may be able to accept a candidate submitted by a staffing party for a job requisition. The user interface may provide an accept option which, when selected, causes the system to initiate a submitted candidate into an interview process for the job requisition. In another example, the hiring firm may be able to reject a candidate submitted by a staffing party for a job requisition. The user interface may provide a rejection option which, when selected, causes the system to remove the candidate from consideration for the job requisition.

Next, process 200 proceeds to block 204 where the exchange system tracks one or more actions performed in the user interface(s) generated in the talent platform(s). In some embodiments, the exchange system may be configured to track an action taken with respect to a candidate submission. For example, the exchange system may detect acceptance candidate submission via the user interface(s). In another example, the exchange system may detect rejection of a candidate submission via the user interface(s). In yet another example, the exchange system may track updates made via the user interface(s) throughout a hiring process. The updates may include a candidate progressing to various interview stages, and/or a candidate being officially hired. In some embodiments, the exchange system may generate user interfaces within the talent platform(s) that allow users of the talent platform to indicate a status of an accepted candidate in a hiring process. The exchange system may be configured to detect the status updates.

Next, process 200 proceeds to block 206 where the exchange system stores transaction data records associated with the action(s) tracked in the user interface(s) generated within the talent platform(s). In some embodiments, the exchange system may be configured to store a record of a particular action performed in a database (e.g., database 104) of the exchange system. For example, the exchange system may be configured to store a record of an acceptance of a candidate by a hiring party. In another example, the exchange system may be configured to store a record of a rejection of a candidate by a hiring party. In some embodiments, the exchange system may be configured to store the record in data profiles of one or more parties associated with the action. For example, the system may be configured to store a record of an acceptance or rejection in a profile associated with a staffing party from which the candidate submission was received. In another example, the system may be configured to store a record of an acceptance or rejection in a profile associated with a hiring party that accepted or rejected a candidate submitted to a job requisition associated with the hiring party.

In some embodiments, the exchange system may be configured to store metadata and/or contextual data associated with an action. In some embodiments, the exchange system may be configured to store a job category of a job requisition associated with the action. For example, if a staffing firm submitted a candidate to a job requisition, the exchange system may store a job category of the job requisition in a record of an acceptance or rejection of the candidate. In some embodiments, the exchange system may be configured to store a salary level, geographic location, amount of work experience, skills requirements, salary level, education level, and/or other information associated with the job requisition in a record of the action. In some embodiments, the exchange system may be configured to store a time at which an action was performed. For example, the exchange system may be configured to store a timestamp at which the exchange system detected performance of an action in a talent platform. In some embodiments, the exchange system may be configured to store an amount of time taken by a party to perform an action in a record associated with the action. For example, the exchange system may be configured to store an amount of time taken for a hiring party to accept or reject a submitted candidate. The exchange system may calculate the time as an amount of time that has passed since the exchange system transmitted an indication of the candidate submission to a hiring talent platform used by the hiring firm.

Next, process 200 proceeds to block 208 where the exchange system determines one or more ratings for one or more parties using the stored transaction records. In some embodiments, the exchange system may be configured to determine a rating for a party based on transaction records stored in a profile associated with the party maintained by the exchange system. For example, the exchange system may be configured to determine a rating for a respective staffing party based on records of rejections and/or acceptances of candidates submitted to job requisitions by the staffing party. The exchange system may be configured to use the records associated with the party to determine one or more ratings for the staffing firm. In another example, the exchange system may be configured to determine a rating for a respective hiring party based on records of actions stored in a profile associated with the hiring party maintained by the exchange system. The exchange system may be configured to use records associated with the hiring party to determine the rating.

In some embodiments, the exchange system may be configured to use one or more machine learning models to determine ratings for the parties. The exchange system may be configured to input transaction data into a machine learning model and determine ratings using a received output. The machine learning model may be a neural network, Bayesian classifier, support vector machine, or other type of machine learning model. The machine learning model may be trained on data and used to classify parties based on data collected about the parties.

Next, process 200 proceeds to block 210 where the exchange system displays the determined rating(s) for the parties in one or more user interfaces generated within the talent platform(s). In some embodiments, the exchange system may be configured to display ratings associated with staffing parties within one or more user interfaces generated within one or more hiring talent platforms. The ratings may provide hiring parties that use the hiring talent platform(s) an indication of how likely the staffing parties are to provide well-qualified candidates for job requisitions. In some embodiments, the exchange system may be configured to display ratings associated with hiring parties in one or more user interfaces generated within one or more staffing talent platforms. The ratings associated with the hiring parties may provide staffing parties that use the staffing talent platform(s) an indication of how responsive the hiring parties are, and/or how much feedback the hiring parties provide during a hiring process. In some embodiments, the exchange system may be configured to display a rating for a staffing party within a user interface of a staffing platform using by the staffing party. The rating may provide the staffing party an indication of the staffing party's performance. In some embodiments, the exchange system may be configured to display a rating for a hiring party within a user interface of a hiring platform used by the hiring party. The rating may provide the hiring party an indication of the hiring party's responsiveness to candidate submissions.

Figure 3:
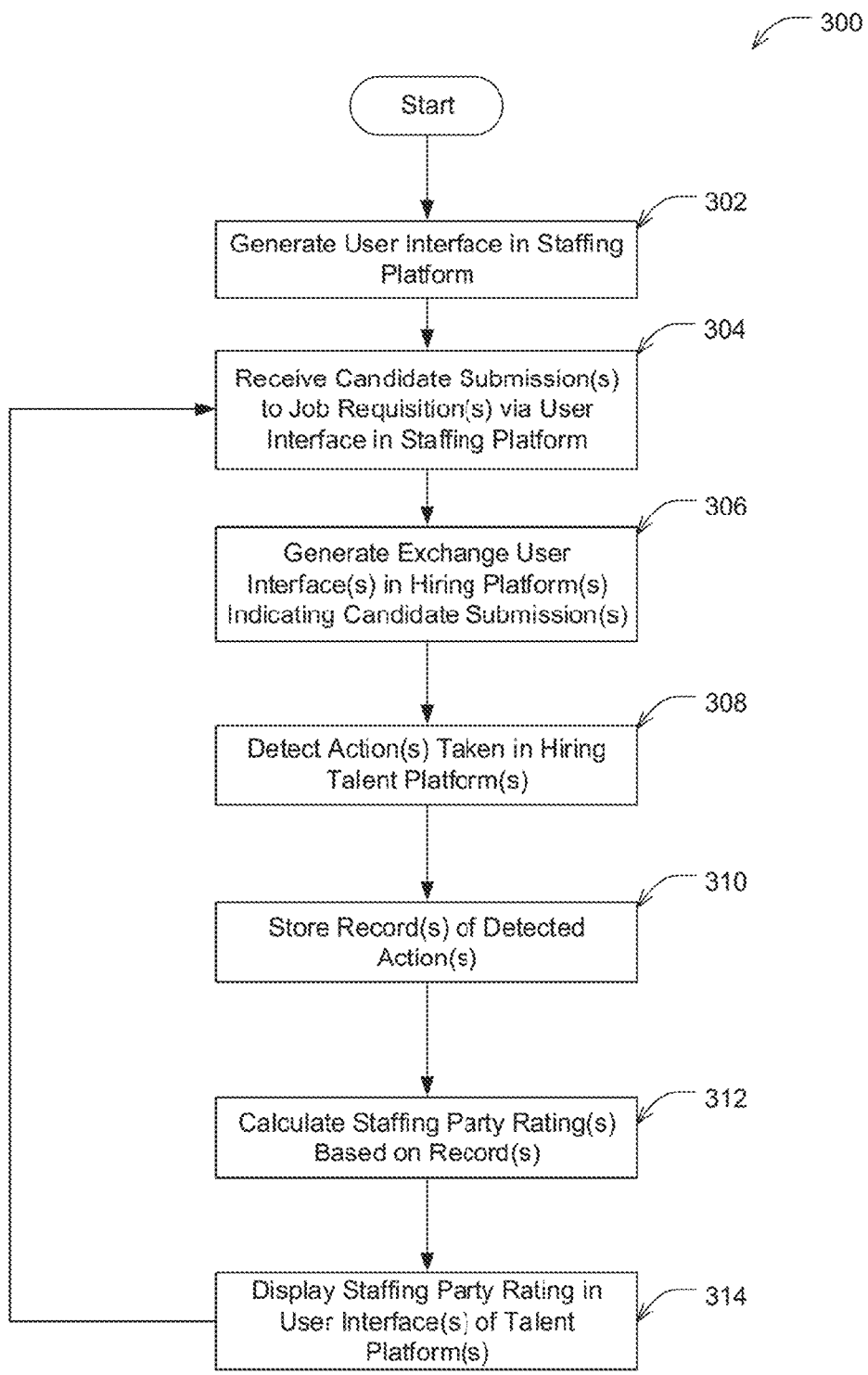
FIG. 3 shows a process for determining a rating for a staffing party according to an aspect of the present application.

FIG. 3 shows an example process 300 for determining a rating for a staffing party according to an aspect of the present application. Process 300 may be performed by exchange system 101 described above with reference to FIG. 1.

Process 300 begins at block 302 where the exchange system generates a user interface within a staffing talent platform used by the staffing party. The user interface may be configured to allow a user to submit one or more candidates to one or more job requisitions stored by the exchange system. The exchange system may have received the job requisition(s) from one or more hiring talent platforms. At this block, the exchange system may generate one or more user interface screens within the staffing talent platform user interface. Examples of such user interface screens are illustrated in FIGS. 5-6.

FIG. 5 illustrates an example of a user interface screen 500 that may be generated by the exchange system within the staffing talent platform for a user of the staffing talent platform to submit a candidate to a job requisition. User interface screen 500 includes a selectable option 502 which a user of the staffing talent platform use to initiate submission of a candidate to a job requisition. In some embodiments, the exchange system may trigger a process of submitting a candidate to the job requisition in response to detecting a selection of the option 502 in user interface screen 500. User interface screen 500 further displays one or more current ratings associated with a user (e.g., a recruiter) of the staffing talent platform. The user interface screen 500 includes an overall rating 504 associated with the recruiter. The user interface screen 500 also includes a job category specific rating 506 of the recruiter for a job category associated with a respective job requisition.

FIG. 6 illustrates an example of a user interface screen 600 that may be generated by the exchange system within the staffing talent platform for a user of the staffing talent platform to provide information about a candidate in order to submit the candidate to the job requisition. User interface screen 600 includes fields 602-610 in which the user can enter a first name, last name, email, and resume of the candidate. User interface screen 600 also includes a field 610 in which the user may specify a placement fee associated with hiring the candidate for the job requisition. In some embodiments, the user interface screen 600 may include one or more other fields in addition or instead of those shown in FIG. 6. Some embodiments are not limited to any particular fields described herein in the user interface screen.

Returning to FIG. 3, after generating the user interface in the staffing talent platform, process 300 proceeds to block 304 where the exchange system receives one or more candidate submissions to one or more job requisitions via the user interface in the staffing talent platform. For example, a user of the staffing talent platform may submit the candidate via user interface screen 500, as described above with reference to FIG. 5, and user interface screen 600, as described above with reference to FIG. 6. In some embodiments, the exchange system may be configured to detect a selection in the user interface that initiates submission of the candidate. For example, the exchange system may detect a selection of a "submit candidate button" in the user interface that triggers retrieval of information about the candidate. In some embodiments, the exchange system may be configured to receive information about the candidate (e.g., via an API with the staffing talent platform). The exchange system may be configured to store a candidate record for the candidate in a database of the exchange system. For example, the exchange system may assign a unique identifier to the candidate in the memory, and store information about the candidate in a data profile of the candidate in the database.

Next, process 300 proceeds to block 306 where the exchange system generates one or more user interfaces within one or more hiring talent platforms that provide an indication of the candidate submission(s) to the job requisition(s). The hiring talent platform(s) may be talent platform(s) used by one or more hiring parties from which the exchange system received the job requisition(s). The user interface(s) may identify a staffing party (e.g., a recruiter, or recruiting firm) from which a respective candidate submission was received for the job requisition(s). At this block, the exchange system may generate one or more user interface screens within the hiring talent platform user interface. Examples of such user interface screens are illustrated in FIGS. 7-8.

FIG. 7 illustrates an example user interface screen 700 generated by the exchange system within a hiring talent platform that provides indications of candidate submissions to a job requisition associated with a hiring firm that uses the hiring talent platform. User interface screen 700 provides a user of the hiring talent platform with information about one or more candidate submissions and options to select to trigger various actions associated with the job requisition. User interface screen 700 includes an option 701 that allows a user of the hiring talent platform to view or edit the job requisition. User interface screen 700 includes an option 702 for pausing submissions to the job requisition. In some embodiments, the exchange system may prevent candidate submissions to the job requisition in response to detecting selection of the option 702 for pausing submissions. The user interface screen 700 displays identification 704 of a staffing party (e.g., a recruiter) from whom the submission was received. The identification may be a name or username of a recruiter, a staffing firm, or other staffing party. The user interface screen 700 displays one or more ratings 706 associated with the staffing party from whom the submission was received. The rating(s) may include an overall rating for the staffing party and/or a job category specific rating for the staffing party for a particular job category associated with the job requisition. If a rating is not available, the user interface screen 700 indicates that a rating is not available. For example, as shown at reference 708 of FIG. 7, the user interface screen 700 may show "No Rating" if a current rating is not available for the staffing party.

Figure 8:
FIG. 8 shows an example of a user interface screen in a talent platform for taking an action for a candidate submission, according to an aspect of the present application.

FIG. 8 illustrates a user interface screen 800 that may be generated by the exchange system within a hiring talent platform for a hiring party (e.g., a talent acquisition specialist, human resources manager or hiring manager) to take one or more actions with respect to a candidate submission. The user interface screen 800 may display information about a staffing party associated with the candidate submission. For example, as shown in FIG. 8, user interface screen 800 shows ratings 802-804 for the staffing party. The ratings include an overall rating 802 of the staffing party and a rating 804 specific to a job category associated with the job requisition. A hiring party may take various actions with respect to the candidate submissions. The user interface screen 800 provides an option 806 for indicating that the hiring party is interested in the candidate, an option 808 to indicate that the candidate is being screened, an option 810 to indicate that the candidate is being interviewed, an option 812 to indicate that the candidate is a finalist, an option 816 to indicate that an offer has been made to the candidate, and/or an option 816 indicating that the candidate has been hired. In some embodiments, the user interface screen 800 may provide an option for indicating that the hiring party is not interested in the candidate or rejects the candidate.

Returning again to FIG. 3, process 300 proceeds to block 308 where the exchange system detects one or more actions performed in the hiring talent platform. In some embodiments, the exchange system may be configured to detect one or more actions performed in a user interface generated by the exchange system in the hiring talent platform(s). For example, the exchange may be configured to detect selection of the options 806-816 illustrated in FIG. 8 indicating actions of a hiring party with respect to a candidate submission. The detected selection may indicate a decision and/or status for the candidate submission. For example, the selection may indicate that a candidate has been accepted by the hiring party. In another example, the selection may indicate that a candidate has been rejected by the hiring party.

Next, process 300 proceeds to block 310 where the exchange system stores one or more records of the detected actions in the user interface(s) generated in the hiring talent platform. In some embodiments, the exchange system may be configured to store a data profile for a staffing party (e.g., a recruiter) that submitted a respective candidate. The exchange system may be configured to store record(s) of action(s) taken by one or more hiring parties within user interface(s) in the hiring talent platform(s) in the data profile. For example, the exchange system may be configured to store an indication that the candidate submission was accepted, rejected, that a hiring party is interested in the candidate, or other record of action as indicated by detected actions in the hiring talent platform(s). In some embodiments, the exchange system may be configured to store metadata and/or context data associated with the action with the record of the action. For example, the exchange system may store a time at which the action was taken (e.g., a timestamp). In another example, the exchange system may store information associated with the job requisition such as job category, salary, experience requirement, education requirement, or other information.

Next, process 300 proceeds to block 312 where the exchange system calculates a rating based on the stored record(s) of the detected action(s) taken with respect to the candidate submission(s). In some embodiments, the exchange system may be configured to calculate a rating between 1 and 5. In some embodiments, the exchange system may be configured to calculate a rating value between 1 and 10. In some embodiments, the rating may be on a continuous scale. In some embodiments, the exchange system may be configured to calculate discrete rating values (e.g., 1, 2, 3, 4, or 5).

In some embodiments, the exchange system may be configured to calculate the rating score based on how many candidate submissions from the staffing party are accepted by respective hiring parties. In some embodiments, an acceptance may be when a hiring party indicates interest in a candidate. In some embodiments, an acceptance may be when a hiring party has interviewed, made an offer to, or hired a candidate. In some embodiments, the exchanges system may be configured to normalize the rating across all staffing parties. To do so, the exchange system may be configured to determine an average probability of a candidate submission being accepted by a hiring party. The exchange system may determine the average probability as a ratio of a total number of detected acceptances to a total number of candidate submissions. The exchange system may then determine a ratio of acceptances to total candidate submissions of the hiring party. The exchange system may use the ratio for the hiring party and the average probability to obtain a normalized recruiter score. For example, the exchange system may divide the ratio of acceptances to candidate submissions of the candidate by the average probability of being accepted to determine how well the staffing party performs relative to all other staffing parties in the exchange system. In some embodiments, the exchange system may be configured to determine a rating value based on the recruiter score. For example, the exchange system may assign a rating based on the recruiter score as follows.

1=Recruiter Score<=0.25
2=0.25<Recruiter Score<=0.5
3=0.5<Recruiter Score<=1.125
4=1.125<Recruiter Score<=1.5
5=Recruiter Score>1.5

Note, the above distribution of rating values based on recruiter score is exemplary. The ranges and associated rating values may be modified. Some embodiments are not limited to particular ranges and/or associated rating values. In some embodiments, the exchange system may be configured to periodically update the ranges and associated rating values.

In some embodiments, the exchange system is configured to calculate a ratio of acceptances to total submissions for a hiring party within a period of time. For example, the exchange system may determine the ratio over the last 90 days. In some embodiments, if the exchange system does not have a record of any candidate submissions for a length of time, the exchange system may not calculate a rating. For example, the exchange system may determine that the staffing party has not had a threshold level of activity for determining a rating value that indicates a performance of the staffing party to other parties. In some embodiments, the exchange system may be configured to calculate the average ratio of acceptance over a certain period of time. For example, the exchange system may be configured to calculate the average ratio of acceptance for all staffing parties in the system over the last 90 days.

In some embodiments, the exchange system may be configured to determine a rating for the staffing party for one or more job categories. For example, the exchange system may be configured to determine a rating for the staffing party based on acceptances of candidate submissions for the one or more job categories. The exchange system may be configured to compare an acceptance ratio of the hiring party for the job category to an average probability of acceptance for all staffing parties in the exchange system. The exchange system may be configured determine the job category specific rating value(s) based on the comparison.

In some embodiments, the exchange system may be configured to calculate a rating for the hiring party if the hiring party has met a threshold of activity. The threshold of activity may be a certain number of candidate submissions within a particular time period. For example, the exchange system may calculate a rating for the hiring party if the hiring party has at least 10 candidate submissions within the past 90 days. In some embodiments, the exchange system may be configured to not calculate a rating for the hiring party if the threshold of activity is not met by the hiring party.

After determining the rating(s) for the staffing party, process 300 proceeds to block 314 where the exchange system displays the rating(s) in one or more user interfaces generated within one or more talent platforms. As illustrated in user interface screen 500 discussed above with reference to FIG. 5, the exchange system may display ratings 504-506 in a user interface used by a staffing party in a staffing talent platform. As illustrated in user interface screen 700 discussed above with reference to FIG. 7, the exchange system may display the ratings 706 in a user interface of a hiring talent platform. As illustrated in user interface screen 800 discussed above with reference to FIG. 8, the exchange system may display ratings 802-804 associated with the staffing party within a user interface screen in which a hiring party may take actions with respect to a candidate submission from the staffing party. At this block, the exchange system may generate user interface screens within the staffing talent platform of a staffing party that display one or more ratings of the staffing party. Examples of such user interface screens are illustrated in FIGS. 9A-9B.

Figure 9A:
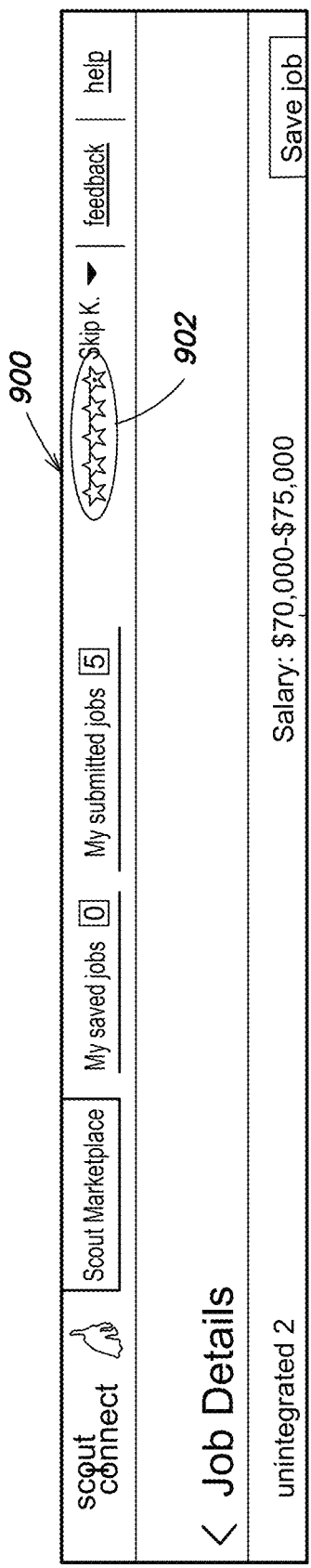
FIGS. 9A-B shows examples of user interface screens in a talent platform showing rating(s) of a staffing party, according to an aspect of the present application.
Figure 9B:
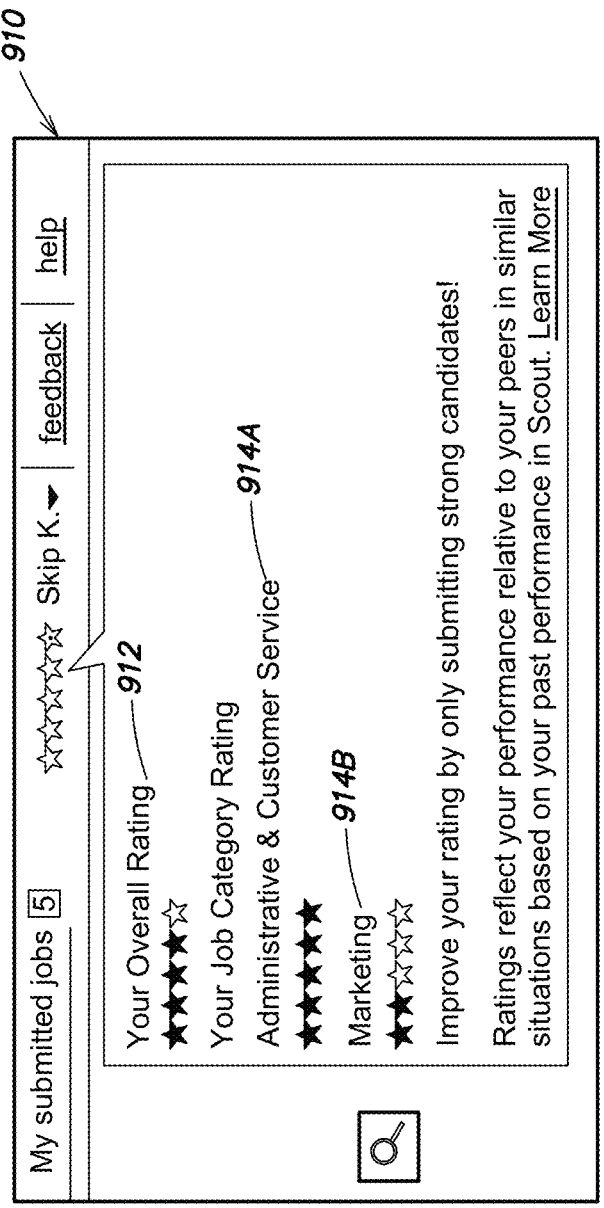

FIGS. 9A-B illustrate example user interface screens 900 and 910 which may be generated by the exchange system within a staffing talent platform used by the staffing party. User interface screen 900 displays an overall rating 902 of the staffing party at the top of the screen 900. User interface screen 910 displays an overall rating 912, and multiple job category specific ratings 914A-B for the staffing party. In some embodiments, the exchange system may be configured to display the multiple ratings in response to detecting a selection of the overall rating 902 in screen 900. For example, the exchange system may detect a click of an option proximate the overall rating and, in response, display the multiple ratings 912, and 914A-B as shown in user interface screen 910.

After displaying the staffing party rating(s) at bock 312, process 300 returns to block 304, where the exchange system continues to return further candidate submissions and proceeds through blocks 306-314 to update the rating(s) and then display the updated rating(s) in the user interface(s) of the talent platform(s).

Figure 4:
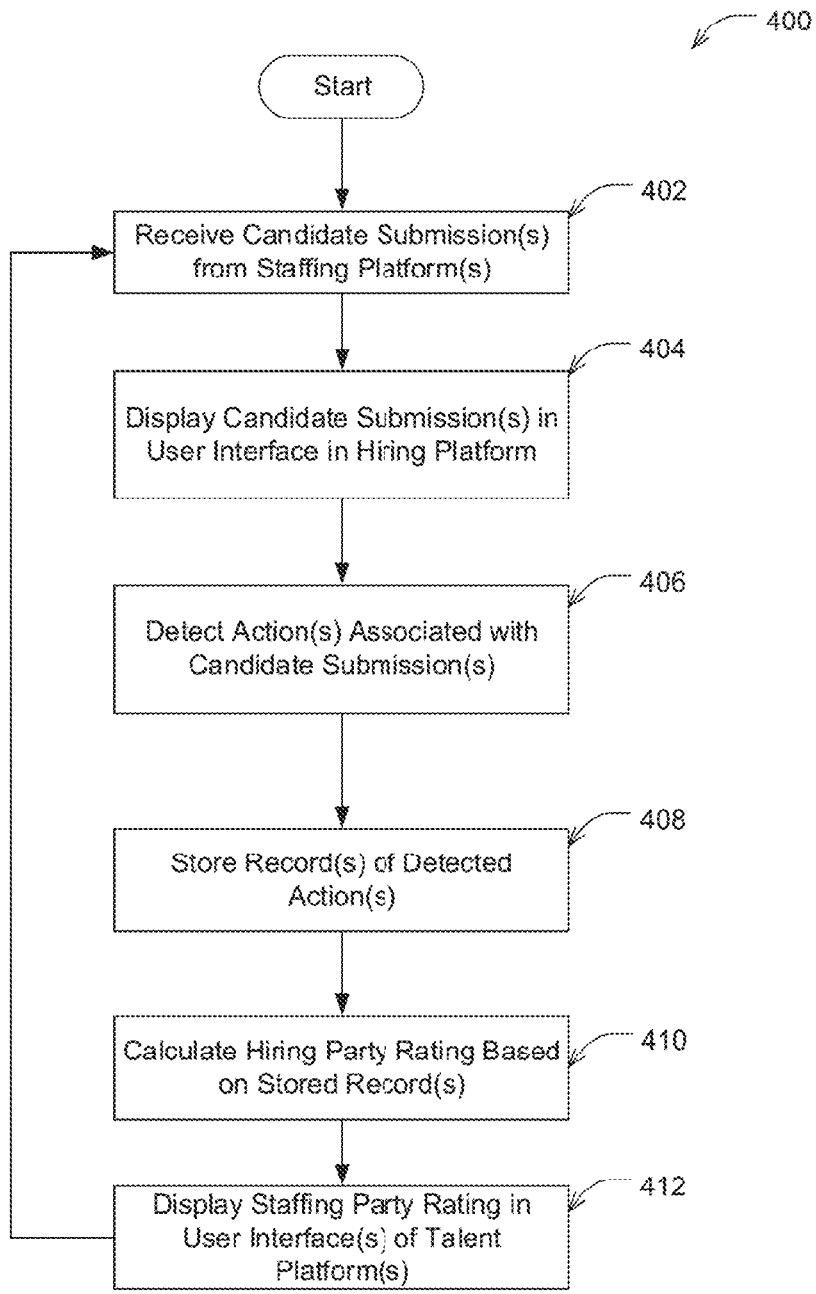
FIG. 4 shows a process for determining a rating for a hiring party according an aspect of the present application.

FIG. 4 shows an example process 400 for determining a rating for a hiring party according to an aspect of the present invention. Process 400 may be performed by exchange system 101 described above with reference to FIG. 1.

Process 400 begins at block 402 where the exchange system receives one or more candidate submissions from one or more staffing talent platforms. In some embodiments, the exchange system may be configured to generate a user interface in the staffing talent platform(s) via which the exchange system receives the candidate submissions. For example, the exchange system may be configured to generate user interface screen 500 described above with reference to FIG. 5 and/or user interface screen 600 described above with reference to FIG. 6 via which the exchange system may receive the candidate submission(s) from the staffing talent platform(s).

Next, process 400 proceeds to block 404 where the exchange system displays candidate submissions within a hiring talent platform used by the hiring party. In some embodiments, the exchange system may be configured to generate a user interface within the hiring talent platform that indicates candidates submitted to one or more job requisitions associated with the hiring party. The exchange system may have previously received the job requisitions from the hiring talent platform. In some embodiments, the exchange system may be configured to generate a user interface in the hiring talent platform via which the exchange system receives the job requisitions. At this block, the exchange system may generate one or more user interface screens within the hiring talent platform user interface. Examples of such user interface screens are illustrated in FIGS. 10-12.

Figure 10:
FIG. 10 shows an example of a user interface screen in a talent platform displaying job requisitions received from a hiring party, according to an aspect of the present application.

FIG. 10 illustrates an example user interface screen 1000 that may be generated by the exchange system within the hiring talent platform displaying job requisitions that have been received by the exchange system from the hiring party. The user interface screen 1000 includes options 1002 that allow the hiring party to view a listing for a job requisition. The user interface screen 1000 includes an indication 1004 of a status of candidates that have been submitted to the job requisition. For example, the user interface screen 1000 includes a display of a number of pending candidates, a number of accepted candidates, a number of candidates who the hiring party has indicated are not of interest for the job requisition, a number of expired candidates, and a total number of candidates that have been accepted to the job requisition.

Figure 11:
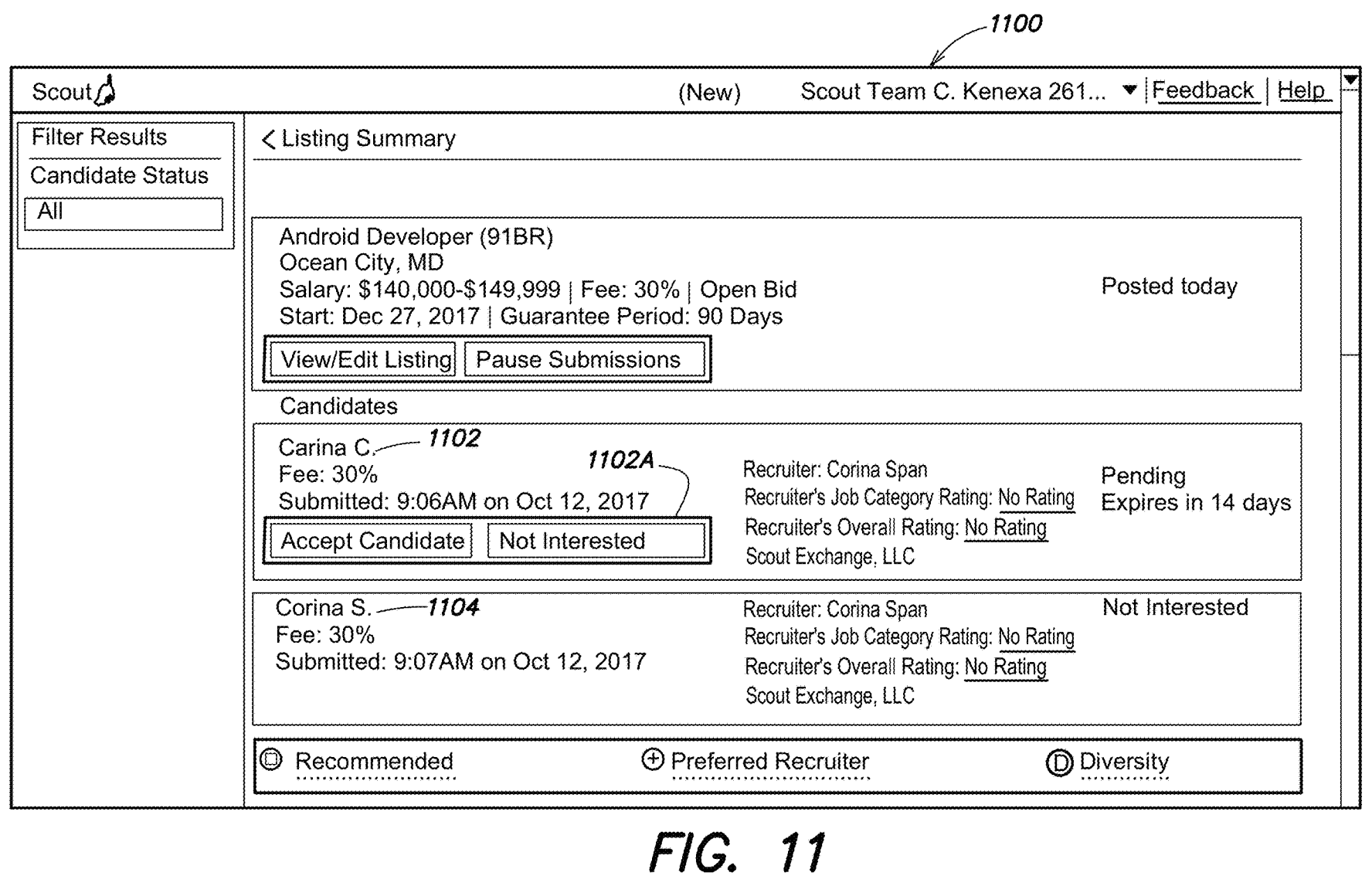

FIG. 11 illustrates an example user interface screen 1100 that may be generated by the exchange system within the hiring talent platform. User interface screen 1100 shows candidates 1102-1104 that have submitted to a job requisition associated with the hiring party. The exchange system may be configured to generate user interface screen in response to detecting a selection of a job requisition displayed in screen 1000 shown in FIG. 10. The user interface screen 1100 may include options 1102A that allow the hiring party to accept a candidate or indicate that the hiring party is not interested in the candidate. The exchange system may be configured to update a stored status of the candidate in the exchange system in response to receiving a selection of one of the options 1102A.

Figure 12:
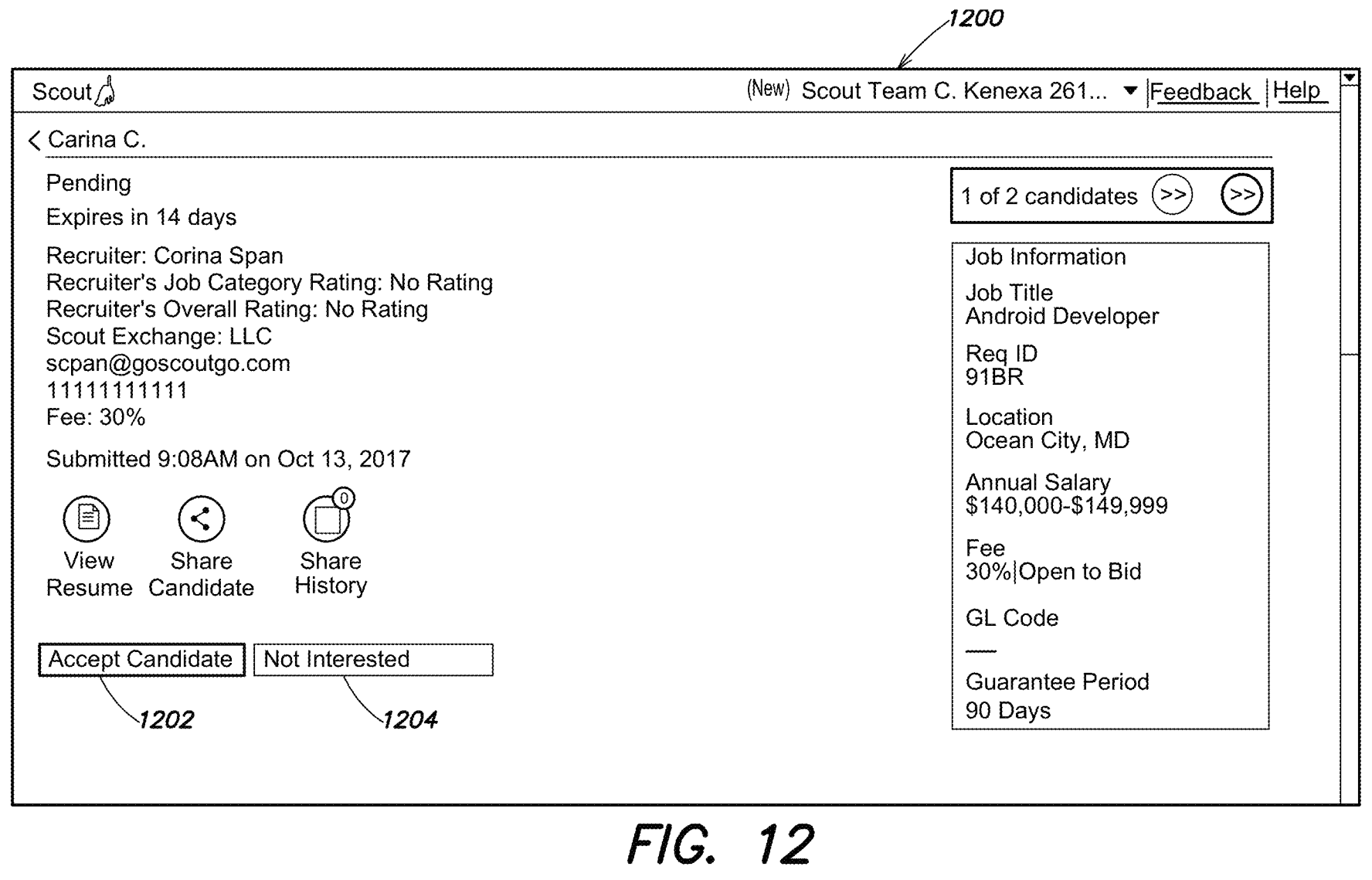

FIG. 12 illustrates an example user interface screen 1200 that may be generated by the exchange system within the hiring talent platform. User interface screen 1200 shows more information about a particular candidate. The exchange system may be configured to generate user interface screen 1200 in response to detecting selection of one of the candidates displayed in user interface screen 1100. User interface screen 1200 shows information about the candidate such as identification information about a staffing party that submitted the candidate, and a fee associated with placing the candidate. User interface screen 1200 further provides options 1202-1204 for the hiring party to take an action with respect to the candidate submission. The user interface screen 1200 provides an option 1202 for the hiring party to accept the candidate. If the option 1202 is selected, the exchange system may detect that the candidate has been accepted by the hiring party. If the option 1204 is selected, the exchange system may detect that the candidate has been rejected by the hiring party.

Returning to FIG. 4, after displaying candidate submission(s) in the hiring talent platform, process 400 proceeds to block 406 where the exchange system detects one or more actions associated with the candidate submission(s). In some embodiments, the exchange system may be configured to generate a user interface within the hiring talent platform that allows the hiring party to take various actions with respect to a candidate submission. For example, as described above with references to FIGS. 11-12, the exchange system may generate one or more user interface screens that include selectable options for accepting the candidate or indicating that the hiring party is not interested in the candidate (e.g., rejecting). In some embodiments, the exchange system may be configured to detect the action(s) based on detecting selections within the user interface generated in the hiring talent platform. For example, the exchange system may detect that the hiring party has accepted or rejected a candidate.

Next, process 400 proceeds to block 408 where the exchange system stores one or more records for the detected action(s). In some embodiments, the exchange system may be configured to store a data profile associated with the hiring party within a database of the exchange system. The exchange system may store records of actions taken by the hiring party in the data profile. In some embodiments, the exchange system may be configured to store metadata and/or contextual data associated with the action. In some embodiments, the exchange system may be configured to store a time (e.g., a timestamp) at which the time was taken. In some embodiments, the exchange system may be configured to determine a period of time that was taken by the hiring party to perform the action. In some embodiments, the exchange system may be configured to calculate the time as an amount of time between at time at which the candidate was submitted to the job requisition and a time at which the action was taken. In some embodiments, the exchange system may be configured to calculate the time taken to perform the action as an amount of time between a time at which the hiring party was notified of the candidate submission within the hiring talent platform and a time at which the action was taken.

Next, process 400 proceeds to block 410 where the exchange system calculates rating for the hiring party based on the stored record(s). In some embodiments, the exchange system may be configured to calculate a rating between 1 and 5. In some embodiments, the exchange system may be configured to calculate a rating value between 1 and 10. In some embodiments, the rating may be on a continuous scale. In some embodiments, the exchange system may be configured to calculate discrete rating values (e.g., 1, 2, 3, 4, or 5).

In some embodiments, the exchange system may be configured to calculate the rating based on one or more measures of responsiveness of the hiring party to candidate submissions. In some embodiments, the exchange system may be configured to determine an average response time of the hiring party. The exchange system may be configured to determine the average time using the stored records of times taken by the hiring party to perform actions. The exchange system may be configured to calculate the hiring party rating based on the average response time. In some embodiments, the exchange system may be configured to determine a percentage of candidates that the hiring party has dispositioned. For example, the exchange system may be configured to determine a percentage of total candidate submissions to job requisitions associated with the hiring party that have either been accepted or rejected by the hiring party. The exchange system may be configured to additionally or alternatively calculate the hiring party rating based on the percentage of the candidates that the hiring party has dispositioned. In some embodiments, the exchange system may be configured to determine a percentage of candidate submissions that the hiring party has viewed. For example, the exchange system may store a record of candidate submissions that have been accessed in the hiring talent platform. The exchange system may use the stored records to determine a percentage of candidate submissions that have been viewed by the hiring party. In some embodiments, the exchange system may be configured to use the percentage of viewed candidate submissions to calculate a rating.

In some embodiments, the exchange system may be configured to determine whether one or more fields of a job requisition have been filled by the hiring party. The exchange system may determine whether one or more types of information have been provided in a submission of a job requisition submitted to the exchange system. For example, the exchange system may determine whether salary information and/or geographic information has been included in the job requisition.

In some embodiments, exchange system may be configured to use a combination of one or more of the measured values described herein to determine the rating for the hiring party. In some embodiments, the exchange system may be configured to normalize the determined value(s). For example, the exchange system may normalize the value(s) with respect to an average performance across all hiring parties in the exchange system. In some embodiments, the exchange system may be configured to calculate the rating based on a function that relates rating to a determined value indicating responsiveness (e.g., an average response time) of the hiring party. In some embodiments, the function may be a linear function relating responsiveness to rating. The linear function may be determined based on a distribution of responsiveness performance across all hiring parties that use the system. For example, values of responsiveness that place a hiring party in a top $20^{th}$ percentile of all hiring parties' responsiveness values may be given a rating of 5, whereas values of responsiveness that place a hiring party in a lowest $20^{th}$ percentile of responsiveness values may be given a rating of 1.

After calculating a rating for the hiring party based on the stored record(s), process 400 proceeds to block 412 where the exchange system displays the hiring party rating in one or more user interfaces in one or more talent platforms. In some embodiments, the talent exchange system may be configured to display the hiring party rating within user interfaces in hiring talent platforms and staffing talent platforms. The displayed ratings may allow hiring parties to view an indication of their performance in placement of candidates. The displayed ratings may also be used by staffing parties to select hiring parties (e.g., employers) for submission of candidates. At this block, the exchange system may generate one or more user interface screens within the user interfaces of the hiring and/or staffing talent platforms. Examples of such user interface screens are illustrated in FIGS. 13, and 14A-B.

Figure 13:
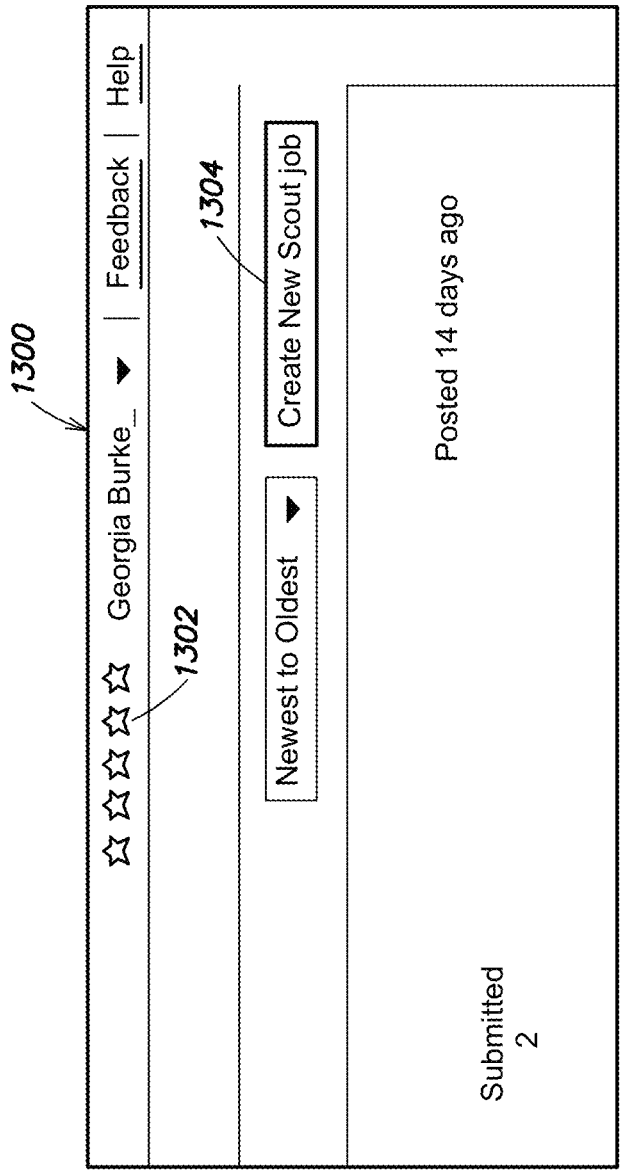
FIG. 13 shows an example of a user interface screen in a talent platform displaying a rating for a hiring party, according to an aspect of the present application.

FIG. 13 shows an example of a user interface screen 1300 that may be generated by the exchange system within a hiring talent platform. The user interface screen 1300 includes a display of a rating 1302 for a hiring party. The user interface screen 1300 further includes an option 1304 that, when selected, triggers generation of a new job requisition in the exchange system.

FIG. 14A shows an example of a user interface screen 1400 that may be generated by the exchange system within a staffing talent platform. The user interface screen 1400 displays job requisitions received by the exchange system from one or more hiring talent platforms used by one or more hiring firms. The user interface screen 1400 includes a display of a rating 1402 for the hiring party that submitted the job requisition. FIG. 14B shows an example of another user interface screen 1410 that may be generated by the exchange system within a staffing talent platform. The user interface screen 1410 shows details about a job requisition. For example, the exchange system 1410 may generate the user interface screen 1410 in response to a selection of a job requisition in user interface screen 1400. The user interface screen 1410 includes a display of a rating 1412 of a hiring party that submitted the job requisition.

Various aspects and functions described herein may be implemented as specialized hardware or software components executing in one or more specialized computer systems, as described further below including with reference to FIG. 15. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod Touches running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 15:
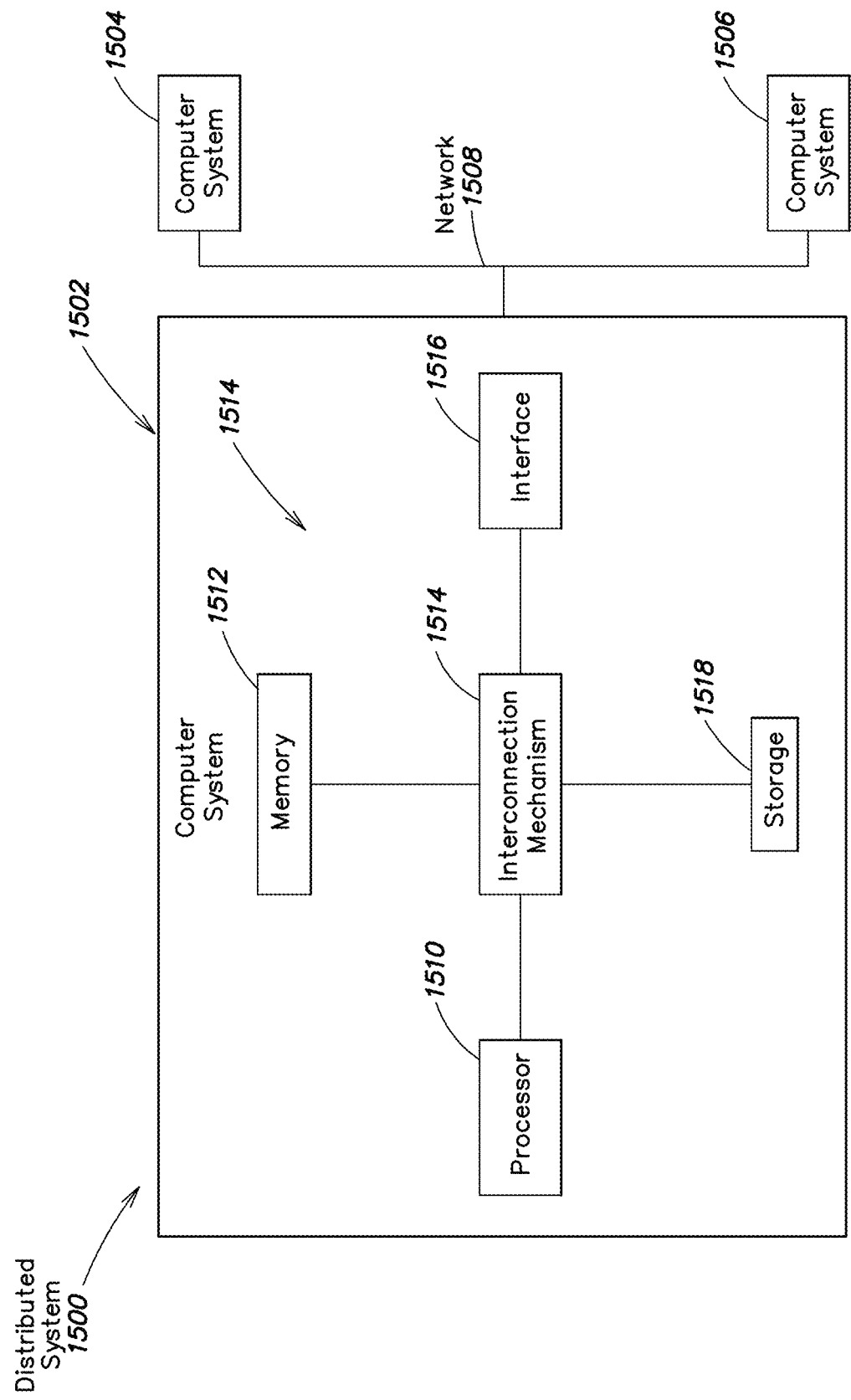
FIG. 15 shows an example distributed computer system in which various aspects of the present application may be implemented.

For example, various aspects, functions, and processes may be distributed among one or more computer systems configured to provide a service to one or more client computers, or to perform an overall task as part of a distributed system, such as the distributed computer system 1500 shown in FIG. 15. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 15, there is illustrated a block diagram of a distributed computer system 1500, in which various aspects and functions are practiced. As shown, the distributed computer system 1500 includes one or more computer systems that exchange information. More specifically, the distributed computer system 1500 includes computer systems 1502, 1504, and 1506. As shown, the computer systems 1502, 1504, and 1506 are interconnected by, and may exchange data through, a communication network 1508. The network 1508 may include any communication network through which computer systems may exchange data. To exchange data using the network 1508, the computer systems 1502, 1504, and 1506 and the network 1508 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS15, JSON, SOAP, CORBA, REST, and Web Services. To ensure data transfer is secure, the computer systems 1502, 1504, and 1506 may transmit data via the network 1508 using a variety of security measures including, for example, SSL or VPN technologies. While the distributed computer system 1500 illustrates three networked computer systems, the distributed computer system 1500 is not so limited and may include any number of computer systems and computing devices, networked using any medium and communication protocol.

As illustrated in FIG. 15, the computer system 1502 includes a processor 1510, a memory 1512, an interconnection element 1514, an interface 1516 and data storage element 1518. To implement at least some of the aspects, functions, and processes disclosed herein, the processor 1510 performs a series of instructions that result in manipulated data. The processor 1510 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 1510 is connected to other system components, including one or more memory devices 1512, by the interconnection element 1514.

The memory 1512 stores programs (e.g., sequences of instructions coded to be executable by the processor 1510) and data during operation of the computer system 1502. Thus, the memory 1512 may be a relatively high performance, volatile, random access memory such as a dynamic random access memory ("DRAM") or static memory ("SRAM"). However, the memory 1512 may include any device for storing data, such as a disk drive or other nonvolatile storage device. Various examples may organize the memory 1512 into particularized and, in some cases, unique structures to perform the functions disclosed herein. These data structures may be sized and organized to store values for particular data and types of data.

Components of the computer system 1502 are coupled by an interconnection element such as the interconnection element 1514. The interconnection element 1514 may include any communication coupling between system components such as one or more physical busses in conformance with specialized or standard computing bus technologies such as IDE, SCSI, PCI and InfiniBand. The interconnection element 1514 enables communications, including instructions and data, to be exchanged between system components of the computer system 1502.

The computer system 1502 also includes one or more interface devices 1516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1502 to exchange information and to communicate with external entities, such as users and other systems.

The data storage element 1518 includes a computer readable and writeable nonvolatile, or non-transitory, data storage medium in which instructions are stored that define a program or other object that is executed by the processor 1510. The data storage element 1518 also may include information that is recorded, on or in, the medium, and that is processed by the processor 1510 during execution of the program. More specifically, the information may be stored in one or more data structures specifically configured to conserve storage space or increase data exchange performance. The instructions may be persistently stored as encoded signals, and the instructions may cause the processor 1510 to perform any of the functions described herein. The medium may, for example, be optical disk, magnetic disk or flash memory, among others. In operation, the processor 1510 or some other controller causes data to be read from the nonvolatile recording medium into another memory, such as the memory 1512, that allows for faster access to the information by the processor 1510 than does the storage medium included in the data storage element 1518. The memory may be located in the data storage element 1518 or in the memory 1512, however, the processor 1510 manipulates the data within the memory, and then copies the data to the storage medium associated with the data storage element 1518 after processing is completed. A variety of components may manage data movement between the storage medium and other memory elements and examples are not limited to particular data management components. Further, examples are not limited to a particular memory system or data storage system.

Although the computer system 1502 is shown by way of example as one type of computer system upon which various aspects and functions may be practiced, aspects and functions are not limited to being implemented on the computer system 1502 as shown in FIG. 15. Various aspects and functions may be practiced on one or more computers having a different architectures or components than that shown in FIG. 15. For instance, the computer system 1502 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1502 may be a computer system including an operating system that manages at least a portion of the hardware elements included in the computer system 1502. In some examples, a processor or controller, such as the processor 1510, executes an operating system. Examples of a particular operating system that may be executed include a Windows-based operating system, such as, the Windows-based operating systems, available from the Microsoft Corporation, a MAC OS System X operating system or an iOS operating system available from Apple Computer, one of many Linux-based operating system distributions, for example, the Enterprise Linux operating system available from Red Hat Inc., or a UNIX operating system available from various sources. Many other operating systems may be used, and examples are not limited to any particular operating system.

The processor 1510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Java, C++, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Recruiter and Candidate Matching

According to one aspect, the exchange system may be configured to match job requisitions to recruiters or to candidates stored in the exchange system. The exchange system may be configured to determine a match score and the match score may be used to provide recommendations to users of the systems. In some embodiments, the exchange system may be configured to match a job requisition to (1) a staffing or search firm recruiter or (2) to a candidate based on information about the recruiter or the candidate. For example, the exchange system may be configured to match the job to a recruiter based on the recruiter transaction history and rating and/or match the job to a candidate based on the candidate's profile in the exchange system, and/or a resume of the candidate stored by the exchange system.

In some embodiments, the exchange system may be configured to augment recruiter or candidate matching by augmenting the job, recruiter and/or candidate data set to create better matches. In some embodiments, the exchange system may be configured to match a job to a staffing party and may augment the data set with additional job description information as well as company profiles of the hiring party and the previous hiring parties for which the staffing party has transaction history. In some embodiments, the exchange may be configured to match a job to a candidate using augmented data sets which include company profiles of the hiring company, profiles and ratings of the recruiters, related job descriptions and other information associated with the job specification as well as company profiles, job descriptions and other data sets associated with the candidate profile. The exchange system may be configured to use the recruiter matching results to augment candidate matching to job requisitions. For example, if a staffing party associated with a candidate matches strongly with the job type and the hiring party profile, the exchange system may increase a score of a candidate match to a job requisition associated with the hiring party.

In some embodiments, the exchange system may be configured to use a candidate's work history to determine matches to one or more job requisitions. The exchange system may be configured to receive information about the work history. As noted above, in some embodiments, the exchange system may be configured to look up and retrieve additional information about the works history. For example, the exchange system may retrieve information about one or more employers in a work history of the candidate, information about industries that the candidate has worked in, and other information. The exchange system may be configured to augment a candidate profile in the exchange system with the information. Additionally, the information may be used by the exchange system to generate a match score that indicates a level (senior contributor, manager, director, etc) at which the candidate matches to a job requisition. In some embodiments, the information may be input into a machine learning system that outputs a match score.

In some embodiments, the exchange system is configured to use work history of a candidate to retrieve additional information to use in matching the candidate to job requisitions. In some embodiments, the exchange system may be configured to access job descriptions, job types, and/or titles. The exchange system may retrieve the information from one or more job requirements on Internet web pages. In some embodiments, the exchange system may be configured to access a job description from a specific company, a similar company, and/or information from a similar job type.

In some embodiments, the exchange system may be configured to use candidate match scores to identify training and development needs for a candidate. For example, the exchange system may be configured to determine skills or education that the candidate needs to improve a match with certain job requisitions.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses described herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features described in connection with any one or more embodiments are not intended to be excluded from a similar role in any other embodiments.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An exchange system comprising:
   a database;
   a network interface coupled to a hiring talent platform associated with a hiring party and to a staffing talent platform associated with a staffing party; and
   at least one processor configured to:
      receive, via the network interface, at least one job requisition from the hiring talent platform;
      in response to receiving the at least one job requisition, cause a graphical user interface executable at the staffing talent platform to display the at least one job requisition;
      determine a rating of the staffing party using information from the at least one job requisition and an augmented dataset in the database;
      cause the graphical user interface executable at the staffing talent platform to display the rating of the staffing party concurrently with displaying the at least one job requisition;
      in response to causing the graphical user interface executable at the staffing talent platform to display the rating of the staffing party, cause the graphical user interface executable at the staffing talent platform to trigger a candidate profile submission process;
      receive at least one candidate profile submission to the at least one job requisition from the staffing talent platform; and
      in response to receiving the at least one candidate profile submission to the at least one job requisition from the staffing talent platform, cause a graphical user interface executable at the hiring talent platform to display the rating of the staffing party in association with displaying the at least one job requisition and the at least one candidate profile submission submitted by the staffing party;
      wherein the rating of the staffing party includes at least a job specific rating indicative of a performance of the staffing party in a job category associated with the at least one job requisition.

2. The exchange system of claim 1, wherein the rating of the staffing party additionally includes an overall rating indicative of overall performance of the staffing party.

3. The exchange system of claim 1, wherein the at least one processor is configured to use the rating of the staffing party to make recommendations to users.

4. The exchange system of claim 1, wherein the at least one processor is configured to:
   store transaction data in the database, the transaction data includes:
      user interactions associated with accepting and/or rejection one or more candidate submissions; and/or
      a time taken to perform respective user interactions at the hiring talent platform; and
   determine the rating of the staffing party at least in part by using the augmented dataset including at least a portion of the transaction data.

5. The exchange system of claim 1, wherein the at least one processor is configured to determine the rating of the staffing party at least in part by using the augmented dataset including:
   additional datasets referenced in at least one of a job description and the at least one candidate profile submission; and/or
   candidate assessments.

6. The exchange system of claim 1, wherein the at least one processor is further configured to execute a trained statistical classifier (TSC), the TSC being configured to:
   classify the at least one job requisition within a class of job requisitions; and
   determine the rating of the staffing party for the class of job requisitions.

7. The exchange system of claim 6, wherein the at least one processor is configured to classify the at least one job requisition using at least one member of a group comprising:
   job category;
   salary;
   experience requirement;
   education requirement; and/or
   geographical location.

8. A method, comprising, by at least one processor of an exchange system comprising a network interface in communication with a hiring talent platform associated with a hiring party and with a staffing talent platform associated with a staffing party:
   receiving, via the network interface, at least one job requisition from the hiring talent platform;
   in response to receiving the at least one job requisition, causing a graphical user interface executable at the staffing talent platform to display the at least one job requisition;
   determining a rating of the staffing party using information from the at least one job requisition and an augmented dataset in a database;
   causing the graphical user interface executable at the staffing talent platform to display the rating of the staffing party concurrently with displaying the at least one job requisition;
   in response to causing the graphical user interface executable at the staffing talent platform to display the rating of the staffing party, causing the graphical user interface executable at the staffing talent platform to trigger a candidate profile submission process;

receiving at least one candidate profile submission to the at least one job requisition from the staffing talent platform; and in response to receiving the at least one candidate profile submission to the at least one job requisition from the staffing talent platform, causing a graphical user interface executable at the hiring talent platform to display the rating of the staffing party in association with displaying the at least one job requisition and the at least one candidate profile submission submitted by the staffing party;

wherein the rating of the staffing party includes at least a job specific rating indicative of a performance of the staffing party in a job category associated with the at least one job requisition.

9. The method of claim 8, wherein the rating of the staffing party additionally includes an overall rating indicative of overall performance of the staffing party.

10. The method of claim 8, further comprising, by the at least one processor: using the rating of the staffing party to make recommendations to users.

11. The method of claim 8, further comprising, by the at least one processor:
storing transaction data in a database of the exchange system, the transaction data includes:
user interactions associated with accepting and/or rejection one or more candidate submissions; and/or
a time taken to perform respective user interactions at the hiring talent platform; and
determining the rating of the staffing party at least in part by using the augmented dataset including at least a portion of the transaction data in the database.

12. The method of claim 8, further comprising, by the at least one processor, determining the rating of the staffing party at least in part by using the augmented dataset including:
additional datasets referenced in at least one of a job description and the at least one candidate profile submission; and/or
candidate assessments.

13. The method of claim 8, further comprising, by the at least one processor, executing a trained statistical classifier (TSC), the TSC being configured to:
classify the at least one job requisition within a class of job requisitions; and
determine the rating of the staffing party for the class of job requisitions.

14. The method of claim 13, further comprising, by the at least one processor, classifying the at least one job requisition using at least one member of a group comprising:
job category;
salary;
experience requirement;
education requirement; and/or
geographical location.

15. A non-transitory computer readable medium containing program instructions that, when executed, cause at least one processor of an exchange system comprising a network interface in communication with a hiring talent platform associated with a hiring party and with a staffing talent platform associated with a staffing party, to perform a method comprising:

receiving, via the network interface, at least one job requisition from the hiring talent platform;

in response to receiving the at least one job requisition, causing a graphical user interface executable at the staffing talent platform to display the at least one job requisition;

determining a rating of the staffing party using information from the at least one job requisition and an augmented dataset in a database;

causing the graphical user interface executable at the staffing talent platform to display the rating of the staffing party concurrently with displaying the at least one job requisition;

in response to causing the graphical user interface executable at the staffing talent platform to display the rating of the staffing party, causing the graphical user interface executable at the staffing talent platform to trigger a candidate profile submission process;

receiving at least one candidate profile submission to the at least one job requisition from the staffing talent platform; and in response to receiving the at least one candidate profile submission to the at least one job requisition from the staffing talent platform, causing a graphical user interface executable at the hiring talent platform to display the rating of the staffing party in association with displaying the at least one job requisition and the at least one candidate profile submission submitted by the staffing party;

wherein the rating of the staffing party includes at least a job specific rating indicative of a performance of the staffing party in a job category associated with the at least one job requisition.

16. The non-transitory computer readable medium of claim 15, wherein the method further comprises:
storing transaction data in a database of the exchange system, the transaction data includes:
user interactions associated with accepting and/or rejection one or more candidate submissions; and/or
a time taken to perform respective user interactions at the hiring talent platform; and
determining the rating of the staffing party at least in part by using the augmented dataset including at least a portion of the transaction data in the database.

17. The non-transitory computer readable medium of claim 15, wherein the method further comprises executing a trained statistical classifier (TSC), the TSC being configured to:
classify the at least one job requisition within a class of job requisitions; and
determine the rating of the staffing party for the class of job requisitions.

* * * * *